United States Patent
Su et al.

(10) Patent No.: US 9,720,266 B2
(45) Date of Patent: Aug. 1, 2017

(54) LIQUID CRYSTAL DISPLAY WITH SWITCHABLE VIEWING ANGLE AND METHOD OF VIEWING ANGLE CONTROL

(71) Applicant: Infovision Optoelectronics (Kunshan) Co., Ltd., Kunshan, Jiangsu Province (CN)

(72) Inventors: Zifang Su, Kunshan (CN); Yaqin Xu, Kunshan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 0 days.

(21) Appl. No.: 15/216,692

(22) Filed: Jul. 21, 2016

(65) Prior Publication Data

US 2017/0059899 A1    Mar. 2, 2017

(30) Foreign Application Priority Data

Aug. 25, 2015   (CN) .......................... 2015 1 0523847

(51) Int. Cl.
 *G02F 1/1343* (2006.01)
 *G02F 1/13* (2006.01)
 (Continued)

(52) U.S. Cl.
 CPC ...... *G02F 1/1323* (2013.01); *G02F 1/133784* (2013.01); *G02F 2001/13712* (2013.01);
 (Continued)

(58) Field of Classification Search
 CPC .......... G02F 1/13306; G02F 1/133345; G02F 1/133528; G02F 1/133784;
 (Continued)

(56) References Cited

U.S. PATENT DOCUMENTS

| 5,280,375 A | * | 1/1994 | Tsuda ................ G02F 1/133753 349/110 |
| 6,525,798 B1 | * | 2/2003 | Yamakita .......... G02F 1/134363 349/106 |

(Continued)

FOREIGN PATENT DOCUMENTS

| CN | 104155808 A | 11/2014 |
| CN | 104865757 A | 8/2015 |
| TW | 201329526 A1 | 7/2013 |

*Primary Examiner* — James Dudek
(74) *Attorney, Agent, or Firm* — Cheng-Ju Chiang

(57) ABSTRACT

An LCD with switchable viewing angle includes a first substrate, second substrate, and a liquid crystal layer. The first substrate is provided with a first electrode and a first alignment film. The second substrate is provided with a second electrode, a third electrode and a second alignment film. The liquid crystal molecules adjacent to the first alignment film are tilted at a first pretilt angle. The liquid crystal molecules adjacent to the second alignment film are tilted at a second pretilt angle. The first pretilt angle and the second pretilt angle have the same magnitude but are contrary in direction. When no bias voltage is applied to the first electrode, the LCD is displayed with a narrow viewing angle; and when a bias voltage is applied to the first electrode, the LCD is displayed with a wide viewing angle.

14 Claims, 23 Drawing Sheets

(51) Int. Cl.
  *G02F 1/1337* (2006.01)
  *G02F 1/137* (2006.01)
(52) U.S. Cl.
  CPC ............ *G02F 2001/133746* (2013.01); *G02F 2001/133773* (2013.01); *G02F 2001/134381* (2013.01)
(58) Field of Classification Search
  CPC ........... G02F 1/133788; G02F 1/13439; G02F 1/1368; G02F 1/137; G02F 1/133514; G02F 1/1339; G02F 1/136286; G02F 1/1323
  See application file for complete search history.

(56) References Cited

U.S. PATENT DOCUMENTS

| | | | |
|---|---|---|---|
| 2002/0113929 A1* | 8/2002 | Yamazaki | G02F 1/134363 349/123 |
| 2003/0151711 A1* | 8/2003 | Yuh | G02F 1/134363 349/129 |
| 2014/0002761 A1 | 1/2014 | Heo et al. | |
| 2014/0104522 A1* | 4/2014 | Onda | G02F 1/134363 349/33 |
| 2015/0022768 A1* | 1/2015 | Li | G02F 1/134309 349/108 |

\* cited by examiner

LIQUID CRYSTAL DISPLAY WITH SWITCHABLE VIEWING ANGLE AND METHOD OF VIEWING ANGLE CONTROL

CROSS-REFERENCE TO RELATED APPLICATION

The present application is based on and claims priority of Chinese patent application No. 201510523847.2, filed on Aug. 25, 2015. The entire disclosure of the above-identified application is hereby incorporated by reference herein and made a part of this specification.

TECHNICAL FIELD

The present application relates to liquid crystal display technology, and more particularly to a liquid crystal display with switchable viewing angle, and a method of controlling the viewing angle of a liquid crystal display.

BACKGROUND

Liquid crystal display (LCD) has many advantages, such as, light weight, energy saving, no radiation, and accordingly has gradually replaced traditional cathode ray tube (CRT) display. LCDs are widely used in high-definition digital televisions, desktop computers, personal digital assistants (PDA), notebook computers, mobile phones, digital cameras, and other electronic devices.

Wide viewing angle is the mainstream development of an LCD. Presently, portable electronic devices such as notebook computers, personal digital assistants, tablet PCs, mobile phones are adopted with wide viewing angle technology, so that users can see the display images on the LCD without distortion when viewed from different viewing angles. However, when using the portable electronic device in public places, the wide viewing angle design of conventional LCD cannot effectively protect the privacy of the user, and the images displayed on the LCD can be easily viewed by a bystander in a squint direction. Therefore, in addition to the needs for a wide viewing angle, LCDs capable of being adjusted to a narrow viewing angle are thus developed in order to protect modern people's needs of privacy in public places.

Currently, there are mainly two ways to switch between a wide viewing angle and a narrow viewing angle in an LCD. One way is to use a louver shielding film to cover the screen so as to reduce the viewing angle in the need for protecting privacy. However, this way needs preparation of an additional louver covering film, causing great inconvenience to the user. One louver covering film can only achieve a fixed viewing angle. Once a louver covering film is attached to the screen, then the viewing angle of the screen is fixed and cannot change according to requirement of the user. The other way is to provide a dual light source backlight system in the LCD to adjust the viewing angle. The dual light source backlight system consists of two layers of laminated light guide plates in combination with an anti-prism lens, the top light guide plate (LGP-T) combined with the anti-prism lens is used to change the direction of lights and restrict the lights in a relatively narrow range to obtain a narrow viewing angle in the LCD, while the bottom light guide plate (LGP-B) combined with the function of the anti-prism lens is used to obtain a wide viewing angle in the LCD. However, the dual light source backlight system will cause the thickness and the cost of the LCD to increase remarkably, which is not in line with the development trend of light weight, compactness and slimness of the LCD.

SUMMARY

The present application provides an LCD which can realize switching between a narrow viewing angle and a wide viewing angle according to requirement, without the need to use a louver shielding film or to provide a dual light source backlight system in the LCD, and without increasing the thickness and the cost of the LCD.

In one aspect, the present application provides an LCD with switchable viewing angle. The LCD includes a first substrate, a second substrate, and a liquid crystal layer disposed between the first substrate and the second substrate. The first substrate is provided with a first electrode, a first alignment film and a first polarizer thereon. The second substrate is provided with a second electrode, a third electrode, a second alignment film and a second polarizer thereon, wherein one of the second electrode and the third electrode is a common electrode, and the other one of the second electrode and the third electrode is a pixel electrode. Liquid crystal molecules of the liquid crystal layer are negative liquid crystal molecules. The liquid crystal molecules adjacent to the first alignment film are tilted at a first pretilt angle relative to the first alignment film. The liquid crystal molecules adjacent to the second alignment film are tilted at a second pretilt angle relative to the second alignment film. The first pretilt angle and the second pretilt angle have the same magnitude but are contrary in direction.

By applying a bias voltage to the first electrode or not, the viewing angle of the LCD is controlled. When no bias voltage is applied to the first electrode, the first pretilt angle and the second pretilt angle are not matched with the light transmission axis of the first polarizer and the second polarizer, a light leakage in dark state is resulted and the contrast of images of the LCD is accordingly decreased, to thereby achieve a narrow viewing angle display mode. When a bias voltage is applied to the first electrode, a vertical electric field is generated between the first substrate and the second substrate to cause the liquid crystal molecules of the liquid crystal layer to rotate. As the liquid crystal molecules rotate, the tilt angle of the liquid crystal molecules adjacent to the first alignment film is reduced from the first pretilt angle, and the tilt angle of the liquid crystal molecules adjacent to the second alignment film is reduced from the second pretilt angle. Particularly, when a certain bias voltage is applied to the first electrode, the tilt angle of the liquid crystal molecules adjacent to the first alignment film may reduce from the first pretilt angle to nearly zero degree in which the liquid crystal molecules adjacent to the first alignment film are substantially parallel to the first substrate, and the tilt angle of the liquid crystal molecules adjacent to the second alignment film may reduce from the second pretilt angle to nearly zero degree in which the liquid crystal molecules adjacent to the second alignment film are substantially parallel to the second substrate. As a result, the light leakage phenomenon in dark state will not occur and the contrast of images of the LCD is increased, thereby achieving a wide viewing angle display mode.

In another aspect, a method of controlling the viewing angle of the LCD is provided. The method includes the steps: when the LCD is required to display with a narrow viewing angle, applying no bias voltage to the first electrode; and when the LCD is required to display with a wide viewing angle, applying a bias voltage to the first electrode.

Therefore, the viewing angle of the LCD can be easily switched between a narrow viewing angle and a wide viewing angle by simply applying a bias voltage to the first electrode of the first substrate. It is not required to use a louver shielding film or to provide a dual light source backlight system in the LCD, without increasing the thickness and the cost of the LCD and having the advantages of easy operation and good flexibility.

The foregoing and other objects, features, aspects and advantages of the present application will become more apparent from the following detailed description when taken in conjunction with the accompanying drawings.

DETAILED DESCRIPTION OF PREFERRED EMBODIMENTS

Exemplary embodiments of the present application are described in detail with reference to the accompanying drawings, but the present application is not limited to the following embodiments.

Figure 1:
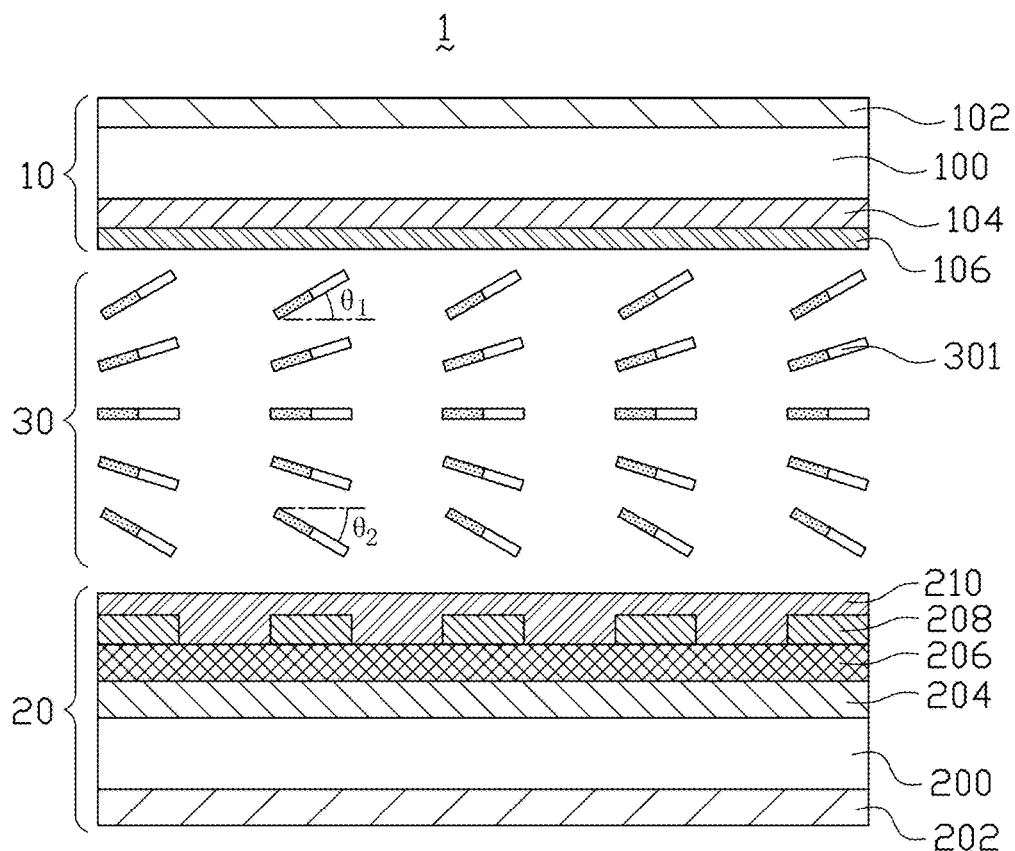
FIG. 1 schematically shows a cross-sectional view of an LCD according to an embodiment of the present application.
Figure 2:
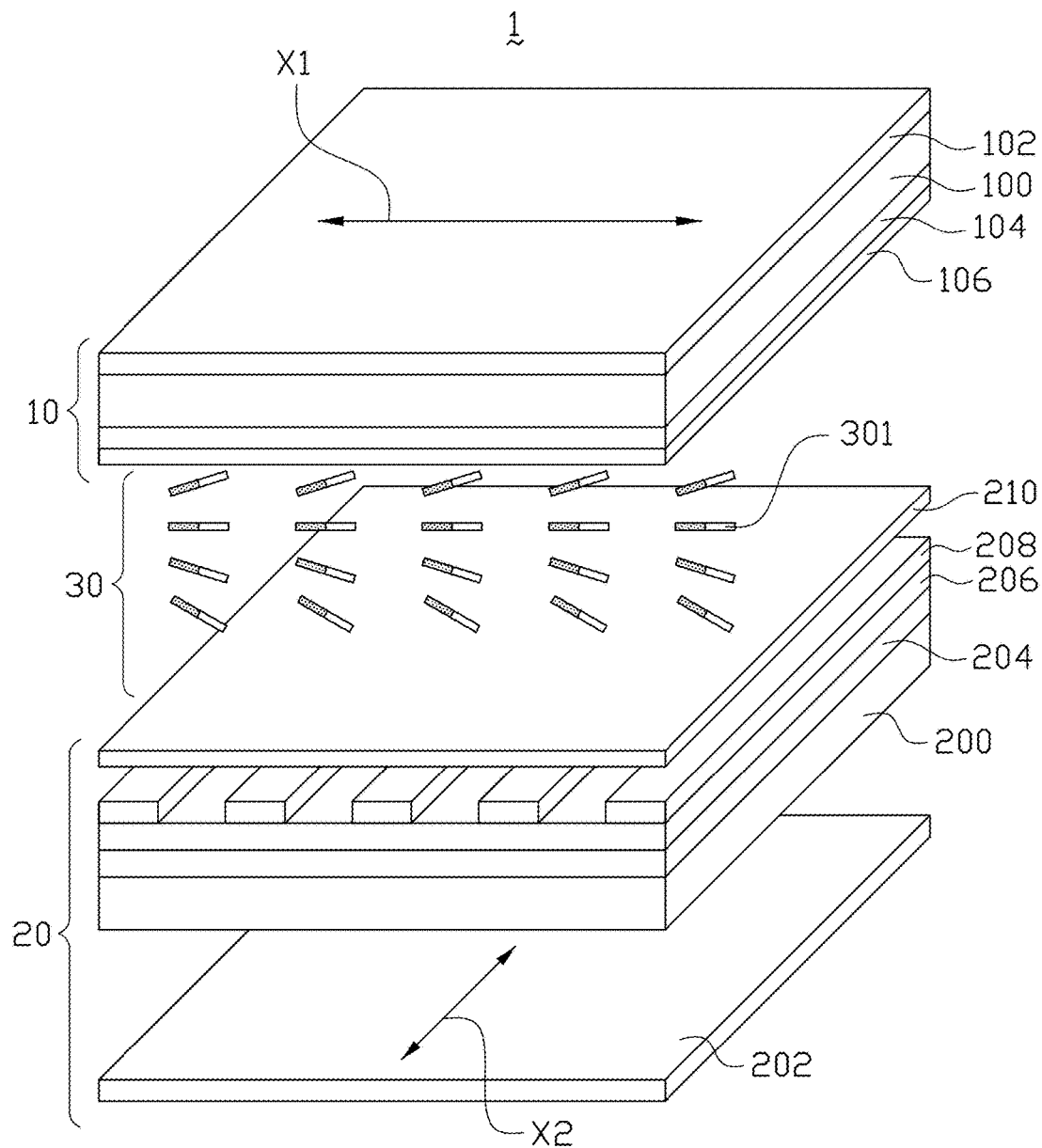
FIG. 2 schematically shows a perspective view of the LCD of FIG. 1.

FIG. 1 schematically shows a cross-sectional view of an LCD according to an embodiment of the present application. FIG. 2 schematically shows a perspective view of the LCD of FIG. 1. In order for clarity, in FIGS. 1-2, only a portion of the LCD is shown. Referring to FIGS. 1-2, the present application provides a liquid crystal display (LCD) 1 with switchable viewing angle. In the embodiment, the LCD 1 includes a first substrate 10, a second substrate 20, and a liquid crystal layer 30 disposed and sealed between the first substrate 10 and the second substrate 20.

Generally, when a user views an LCD from different viewing angles, the brightness of image may reduce as the viewing angle increases. For traditional twisted nematic (TN) type LCD, common electrode and pixel electrode are separately formed on two different substrates, the liquid crystal molecules rotate in a plane orthogonal to the substrates. However, a viewing angle of TN type LCD is narrow as the orientations of liquid crystal molecules adjacent to the surfaces of the two substrates are orthogonal with each other. In order to realize wide viewing angle, both in-plane switch (IPS) type LCD employing a horizontal electric field and fringe field switching (FFS) type LCD employing a fringe electric field have been developed. For IPS type LCD or FFS type LCD, common electrode and pixel electrode are both formed on the same substrate (e.g., the array substrate), the liquid crystal molecules rotate in a plane in parallel to the substrate to obtain improved viewing angle.

The LCD 1 is suitable for being applied in an FFS type LCD or an IPS type LCD in which the liquid crystal molecules rotate in a plane in parallel to the substrate when an electric field generated between the pixel electrode and the common electrode is provided to the liquid crystal molecules for display. In this embodiment, the LCD 1 is shown as an FFS type LCD by an example.

Specifically, the first substrate 10 may be a color filter substrate. The first substrate 10 may include a first transparent base 100, a first polarizer 102, a first electrode 104, and a first alignment film 106. The first polarizer 102 is arranged on an outer surface of the first transparent base 100 far away from the liquid crystal layer 30. The first polarizer 102 has a first light transmission axis X1 (see FIG. 2). The first electrode 104 is arranged on an inner surface of the first transparent base 100 facing the liquid crystal layer 30. The first alignment film 106 is arranged on an inner surface of the first electrode 104 facing the liquid crystal layer 30. The first electrode 104 is transparent, and may be made of Indium Tin Oxide (ITO), Indium Zinc Oxide (IZO) or the like. The first electrode 104 may wholly cover the first transparent base 100, that is, the first electrode 104 is a surface electrode without being patterned.

The second substrate 20 may be a thin film transistor (TFT) array substrate. The second substrate 20 may include a second transparent base 200, a second polarizer 202, a second electrode 204, an insulating layer 206, a third electrode 208, and a second alignment film 210. The second polarizer 202 is arranged on the outer surface of the second transparent base 200 far away from the liquid crystal layer 30. The second polarizer 202 has a second light transmission axis X2 (see FIG. 2). The first light transmission axis X1 of the first polarizer 102 and the second light transmission axis X2 of the second polarizer 202 are perpendicular to each other. The second electrode 204 is arranged on an inner surface of the second transparent base 200 facing the liquid crystal layer 30. The insulating layer 206 is arranged on an inner surface of the second electrode 204 facing the liquid crystal layer 30. The third electrode 208 is arranged on the inner surface of the insulating layer 206 facing the liquid crystal layer 30. The second alignment film 210 is arranged on an inner surface of the third electrode 208 facing the liquid crystal layer 30.

The second electrode 204 and the third electrode 208 are transparent, and may be made of Indium Tin Oxide (ITO), Indium Zinc Oxide (IZO) or the like. In the embodiment, the second electrode 204 may wholly cover the second transparent base 200, that is, the second electrode 204 is a surface electrode without being patterned. The third electrode 208 is patterned to form a plurality of electrode stripes (not labeled) which are arranged in parallel to each other. In other embodiments, similar to the third electrode 208, the second electrode 204 may also be patterned to form a plurality of electrode stripes which are arranged in parallel to each other.

In one embodiment, the second electrode 204 may be a pixel electrode, which is formed in each pixel of the LCD 1, the third electrode 208 may be a common electrode for inputting a common voltage (i.e., Vcom) from a driver IC (not shown).

In another embodiment, the second electrode 204 may be a common electrode for inputting a common voltage (i.e., Vcom) from a driver IC (not shown), the third electrode 208 may a pixel electrode, which is formed in each pixel of the LCD 1.

The liquid crystal layer 30 is provided with a plurality of liquid crystal molecules 301 which are sealed between the first alignment film 106 and the second alignment film 210. The first alignment film 106 and the second alignment film 210 can be made of polyimide (PI). The first alignment film 106 and the second alignment film 210 are used to align the liquid crystal molecules 301, so that the liquid crystal molecules 301 are oriented in predetermined directions. For example, each of the alignment films 106, 210 may be subjected to a rubbing treatment according to publicly known rubbing process. After the rubbing process, the first alignment film 106 has a first rubbing direction (not shown), the second alignment film 210 has a second rubbing direction (not shown). In this embodiment, the first rubbing direction of the first alignment film 106 is opposite to the second rubbing direction of the second alignment film 210.

The liquid crystal molecules 301 adjacent to the first alignment film 106 are arranged and oriented along the first rubbing direction of the first alignment film 106. The liquid crystal molecules 301 adjacent to the second alignment film 210 are arranged and oriented along the second rubbing direction of the second alignment film 210.

Further, as shown in FIG. 1, the liquid crystal molecules 301 adjacent to the first alignment film 106 are tilted at a first pretilt angle $\theta_1$ relative to the first alignment film 106. That is, an acute angle $\theta_1$ is formed between the surface of the first alignment film 106 and the long axis of the liquid crystal molecules 301 adjacent to the first alignment film 106, so that the liquid crystal molecules 301 adjacent to the first alignment film 106 are arranged along the first rubbing direction at a tilted state. The liquid crystal molecules 301 adjacent to the second alignment film 210 are tilted at a second pretilt angle $\theta_2$ relative to the second alignment film 210. That is, an acute angle $\theta_2$ is formed between the surface of the second alignment film 210 and the long axis of the liquid crystal molecules 301 adjacent to the second alignment film 210, so that the liquid crystal molecules 301 adjacent to the second alignment film 210 are arranged along the second rubbing direction at a tilted state.

The first pretilt angle $\theta_1$ and the second pretilt angle $\theta_2$ have the same magnitude but are contrary in direction (i.e., one of the pretilt angles $\theta_1$ and the pretilt angles $\theta_2$ is positive, and the other one of the pretilt angles $\theta_1$ and the pretilt angles $\theta_2$ is negative). As shown in the embodiment of FIG. 1, the liquid crystal molecules 301 adjacent to the first alignment film 106 are tilted in a counter-clockwise direction to form the first pretilt angle $\theta_1$ which is a positive angle, and the liquid crystal molecules 301 adjacent to the second alignment film 210 are tilted in a clockwise direction to form the second pretilt angle $\theta_2$ which is a negative angle. Preferably, the first pretilt angle $\theta_1$ is in the range of 30°~80°, i.e., 30°≤$\theta_1$≤80°. The second pretilt angle $\theta_2$ has the same magnitude as the first pretilt angle $\theta_1$, i.e., the second pretilt angle $\theta_2$ may have a magnitude in the range of 30°~80°. For example, if in a specific embodiment, the first pretilt angle $\theta_1$ is at 40°, the second pretilt angle $\theta_2$ will be −40°, that is, the first pretilt angle $\theta_1$ and the second pretilt angle $\theta_2$ have the same magnitude of 40° but are in contrary directions.

Liquid crystal molecules are generally divided into positive liquid crystal molecules and negative liquid crystal molecules. In the embodiment, the liquid crystal molecules 301 of the liquid crystal layer 30 are negative liquid crystal molecules. The negative liquid crystal molecules 301 will rotate to a direction perpendicular to the electric field. When the LCD 1 is applied with an electric field for display by a voltage difference exerted between the second electrode 204 and the third electrode 208, the negative liquid crystal molecules 301 of the liquid crystal layer 30 will rotate in a plane in parallel to the first substrate 10 and the second substrate 20, and the short axis of the negative liquid crystal molecules 301 are parallel to the electric field, so that the LCD 1 has better light transmission.

Figure 3:
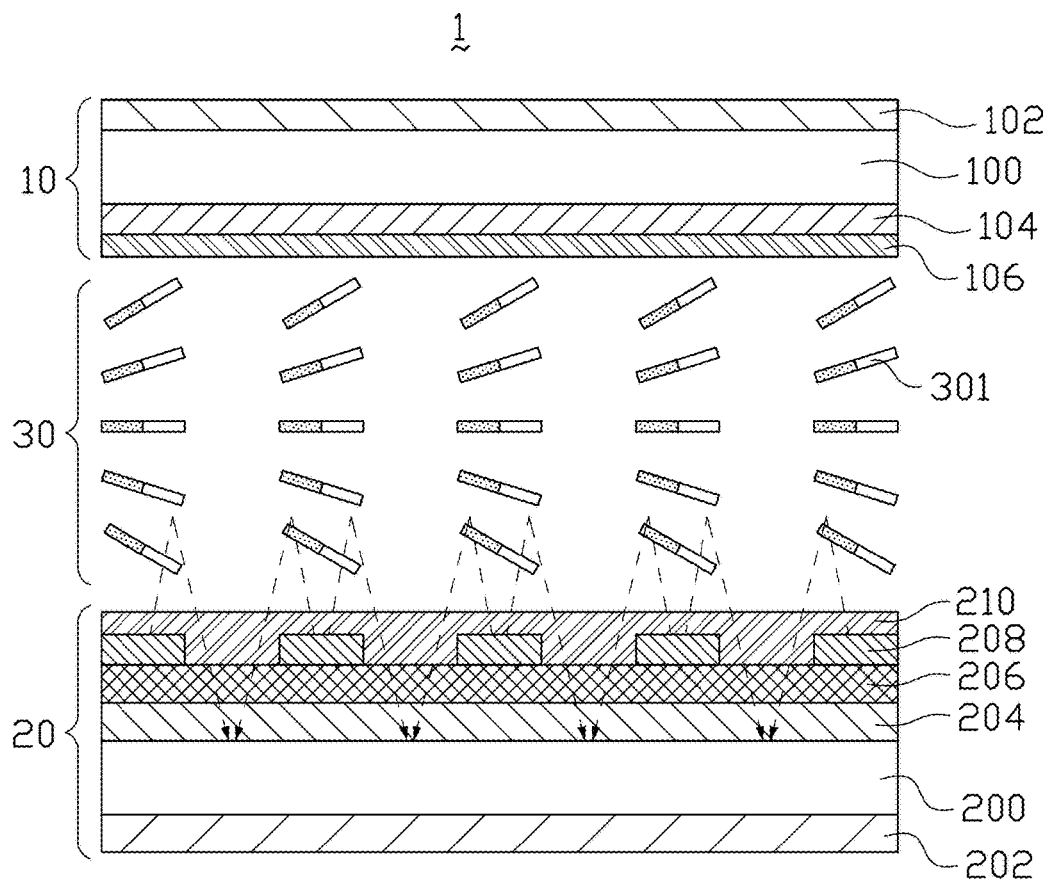
FIG. 3 schematically shows a cross-sectional view of the LCD of FIG. 1 in a narrow viewing angle display mode.
Figure 4:
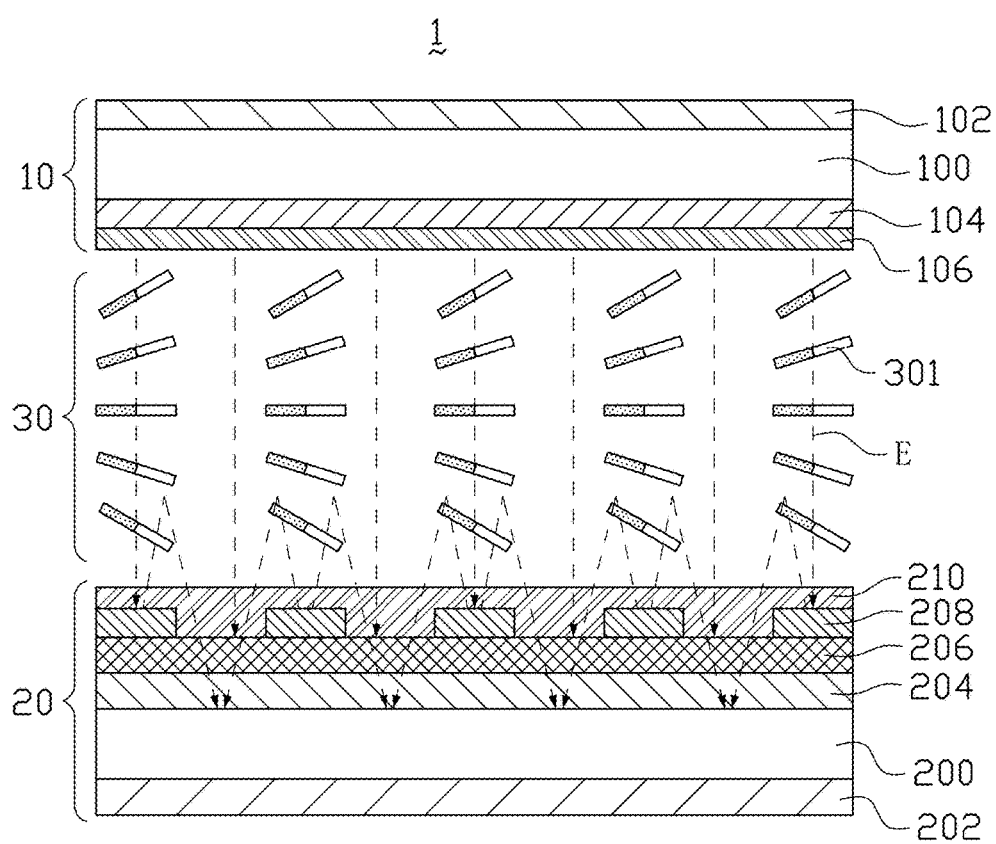
FIG. 4 schematically shows a cross-sectional view of the LCD of FIG. 1 in a wide viewing angle display mode.

Referring to FIGS. 3-4, the LCD 1 can be switched between a narrow viewing angle and a wide viewing angle. In FIG. 3, the LCD 1 is shown for display with a narrow viewing angle. In FIG. 4, the LCD 1 is shown for display with a wide viewing angle.

As shown in FIG. 3, when no bias voltage is applied to the first electrode 104, the LCD 1 shows a narrow viewing angle. In the present LCD 1, the liquid crystal molecules 301 adjacent to the first substrate 10 are initially tilted at the first pretilt angle $\theta_1$ relative to the first substrate 10, the liquid crystal molecules 301 adjacent to the second substrate 20 are initially tilted at the second pretilt angle $\theta_2$ relative to the second substrate 20, the first pretilt angle $\theta_1$ and the second pretilt angle $\theta_2$ are same in magnitude, but are contrary in direction. Therefore, when the LCD 1 is used for display, lights passing through the liquid crystal molecules 301 will no longer match with the light transmission axis X1, X2 of the first polarizer 102 and the second polarizer 202 due to phase delay, a light leakage phenomenon is resulted, and the contrast of images displayed in the screen is accordingly decreased when the LCD 1 is viewed from a squint direction. Thus, the viewing effect of the LCD 1 is affected to achieve a narrow viewing angle display mode.

As shown in FIG. 4, when a bias voltage (e.g., 5V) is provided to the first electrode 104, a vertical electric field E will be generated between the first substrate 10 and the second substrate 20. The negative liquid crystal molecules 301 will rotate under the action of the vertical electric field E. As the liquid crystal molecules 301 rotate under the action of the vertical electric field E, the tilt angle of the liquid crystal molecules 301 adjacent to the first substrate 10 is gradually reduced from the initial first pretilt angle $\theta_1$, and the tilt angle of the liquid crystal molecules 301 adjacent to the second substrate 20 is gradually reduced from the initial second pretilt angle $\theta_2$. When the tilt angle of the liquid crystal molecules 301 adjacent to the first substrate 10 is reduced to nearly be parallel with the first substrate 10 and the tilt angle of the liquid crystal molecules 301 adjacent to the second substrate 20 is reduced to nearly be parallel with the second substrate 20, the light leakage phenomenon will not occur when the LCD 1 is viewed from a squint direction. Thus, the viewing angle of the LCD 1 is enlarged to achieve a wide viewing angle display mode the same as traditional FFS LCD.

It should be noted that, under the action of the vertical electric field E generated between the first substrate 10 and the second substrate 20, the liquid crystal molecules 301 adjacent to the first substrate 10 may become substantially parallel to the first substrate 10 with an tilt angle of about 2°, and the liquid crystal molecules 301 adjacent to the second substrate 20 may become substantially parallel to the second substrate 20 with an tilt angle of about 2°. In the following, TechWiz software is used to simulate the viewing angle and the display effect of the LCD 1.

Figure 5A:
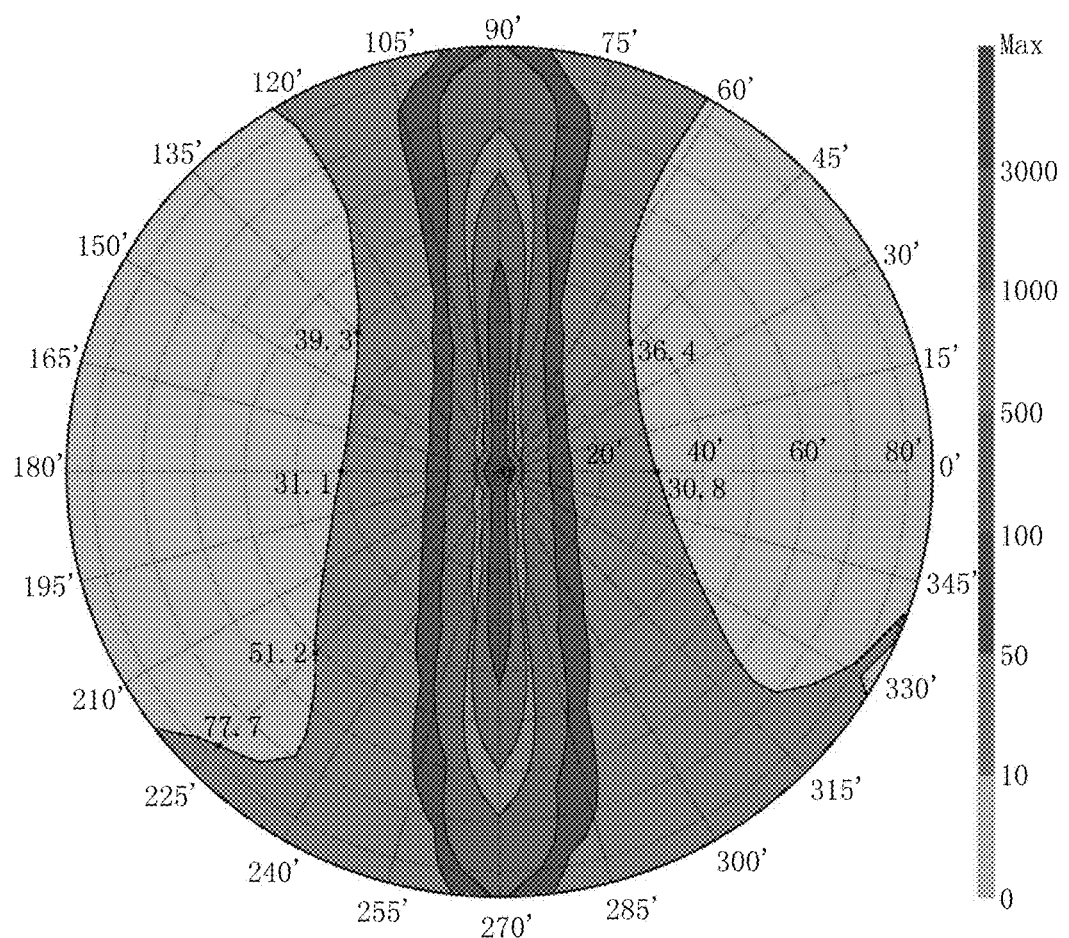
FIGS. 5a-5f show various viewing angle simulation results of the LCD of FIG. 1 when no bias voltage is applied to the first electrode.
Figure 5B:
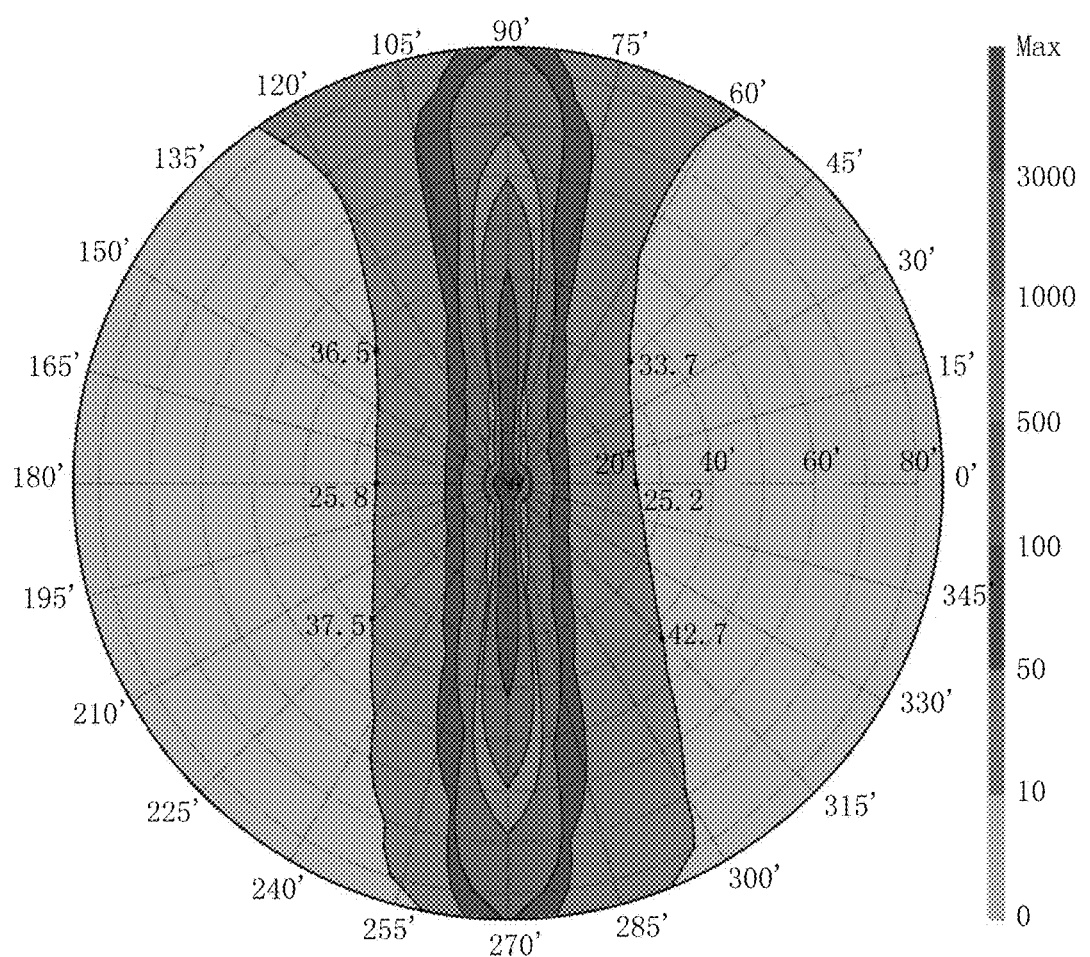
Figure 5C:
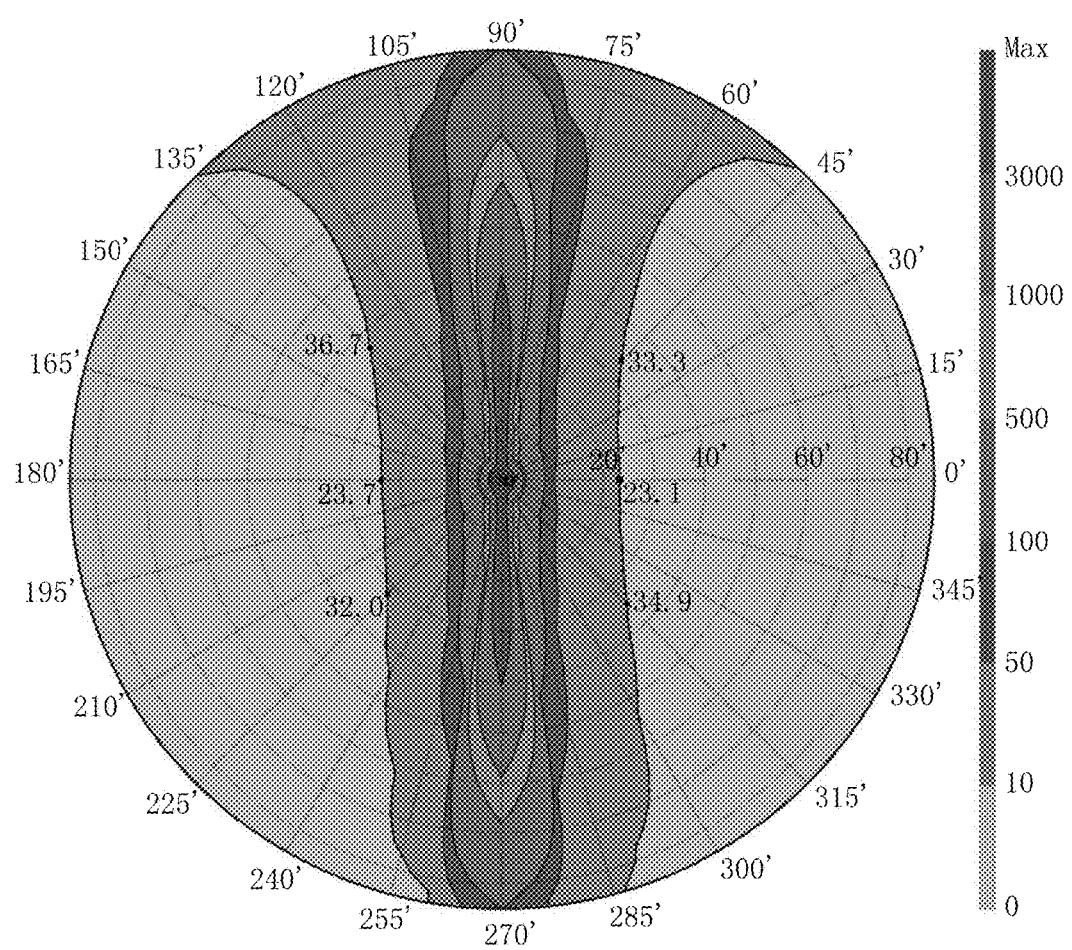
Figure 5D:
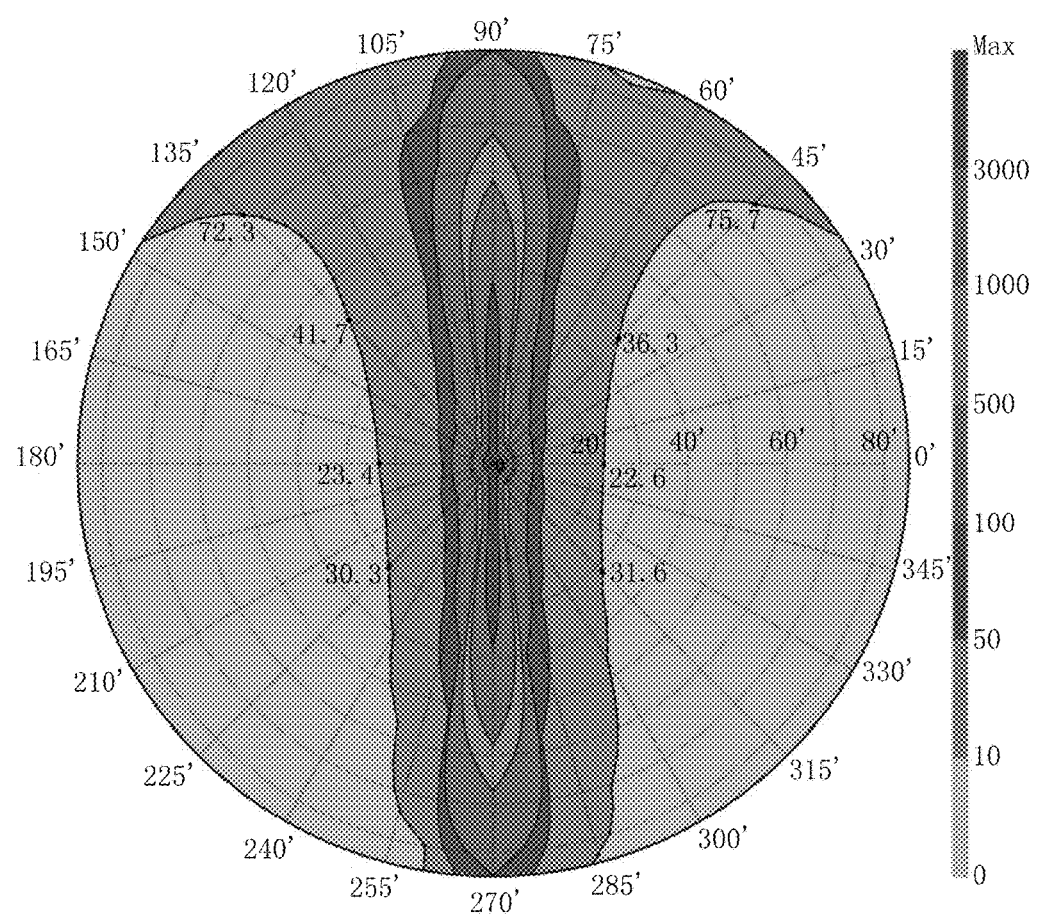
Figure 5E:
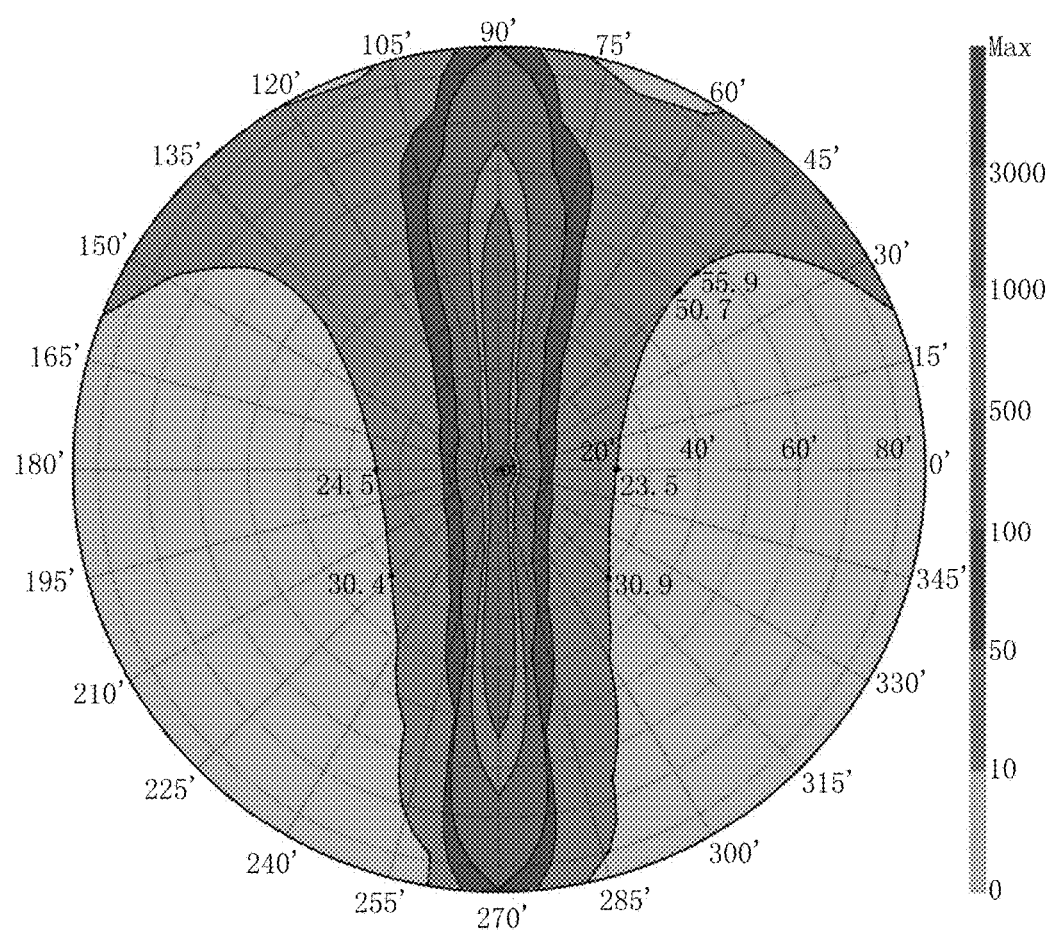
Figure 5F:
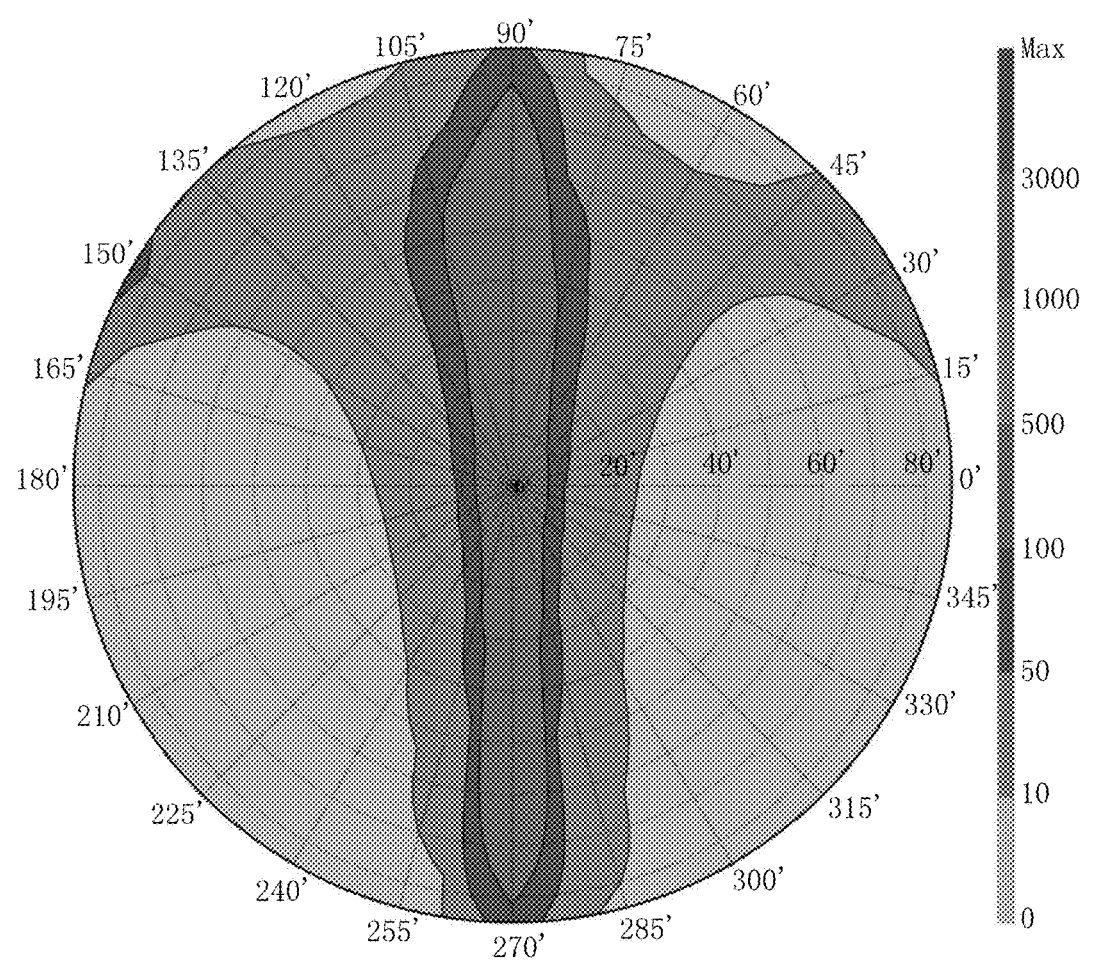

FIGS. 5a-5f show various viewing angle simulation results of the LCD 1 when no bias voltage is applied to the first electrode 104. Among them, FIG. 5a shows the viewing angle simulation result when the initial first pretilt angle $\theta_1$ and the initial second pretilt angle $\theta_2$ have a magnitude of 30°; FIG. 5b shows the viewing angle simulation result when the initial first pretilt angle $\theta_1$ and the initial second pretilt angle $\theta_2$ have a magnitude of 40°; FIG. 5c shows the viewing angle simulation result when the initial first pretilt angle $\theta_1$ and the initial second pretilt angle $\theta_2$ have a magnitude of 50°; FIG. 5d shows the viewing angle simulation result when the initial first pretilt angle $\theta_1$ and the initial second pretilt angle $\theta_2$ have a magnitude of 60°; FIG. 5e shows the viewing angle simulation result when the initial first pretilt angle $\theta_1$ and the initial second pretilt angle $\theta_2$ have a magnitude of 70°; and FIG. 5f shows the viewing angle simulation result when the initial first pretilt angle $\theta_1$ and the initial second pretilt angle $\theta_2$ have a magnitude of 80°. As can be seen from FIGS. 5a to 5f, with the increase of the initial first pretilt angle $\theta_1$ and the initial second pretilt angle $\theta_2$, the center contrast of the LCD 1 decreases, and the LCD 1 has a viewing angle of about 25 degrees in the horizontal direction. For example, when the initial first pretilt angle $\theta_1$ and the initial second pretilt angle $\theta_2$ have a magnitude of 30°, the center contrast is 6720.29, and the LCD 1 can only be effectively viewed from a viewing angle from about −31 degrees to about 30 degrees in the horizontal direction, as shown in FIG. 5a; when the initial first pretilt angle $\theta_1$ and the initial second pretilt angle $\theta_2$ have a magnitude of 40°, the center contrast is 6365.24, and the LCD 1 can only be effectively viewed from a viewing angle from about −26 degrees to about 25 degrees in the horizontal direction, as shown in FIG. 5b; when the initial first pretilt angle $\theta_1$ and the initial second pretilt angle $\theta_2$ have a magnitude of 50°, the center contrast is 5874.33, and the LCD 1 can only be effectively viewed from a viewing angle from about −24 degrees to about 23 degrees in the horizontal direction, as shown in FIG. 5c; when the initial first pretilt angle $\theta_1$ and the initial second pretilt angle $\theta_2$ have a magnitude of 60°, the center contrast is 4904.2, and the LCD 1 can only be effectively viewed from a viewing angle from about −23 degrees to about 23 degrees in the horizontal direction, as shown in FIG. 5d; when the initial first pretilt angle $\theta_1$ and the initial second pretilt angle $\theta_2$ have a magnitude of 70°, the center contrast is 2502.84, and the LCD 1 can only be effectively viewed from a viewing angle from about −25 degrees to about 24 degrees in the horizontal direction, as shown in FIG. 5e; and when the initial first pretilt angle $\theta_1$ and the initial second pretilt angle $\theta_2$ have a magnitude of 80°, the center contrast is 263.579, and the LCD 1 can only be effectively viewed from a viewing angle from about −25 degrees to about 20 degrees in the horizontal direction, as shown in FIG. 5f. From FIGS. 5a to 5f, it can be seen that the LCD 1 can achieve a narrow viewing angle and meets the requirement for protecting the privacy under the narrow viewing angle display mode when no bias voltage is applied to the first electrode 104.

Figure 6A:
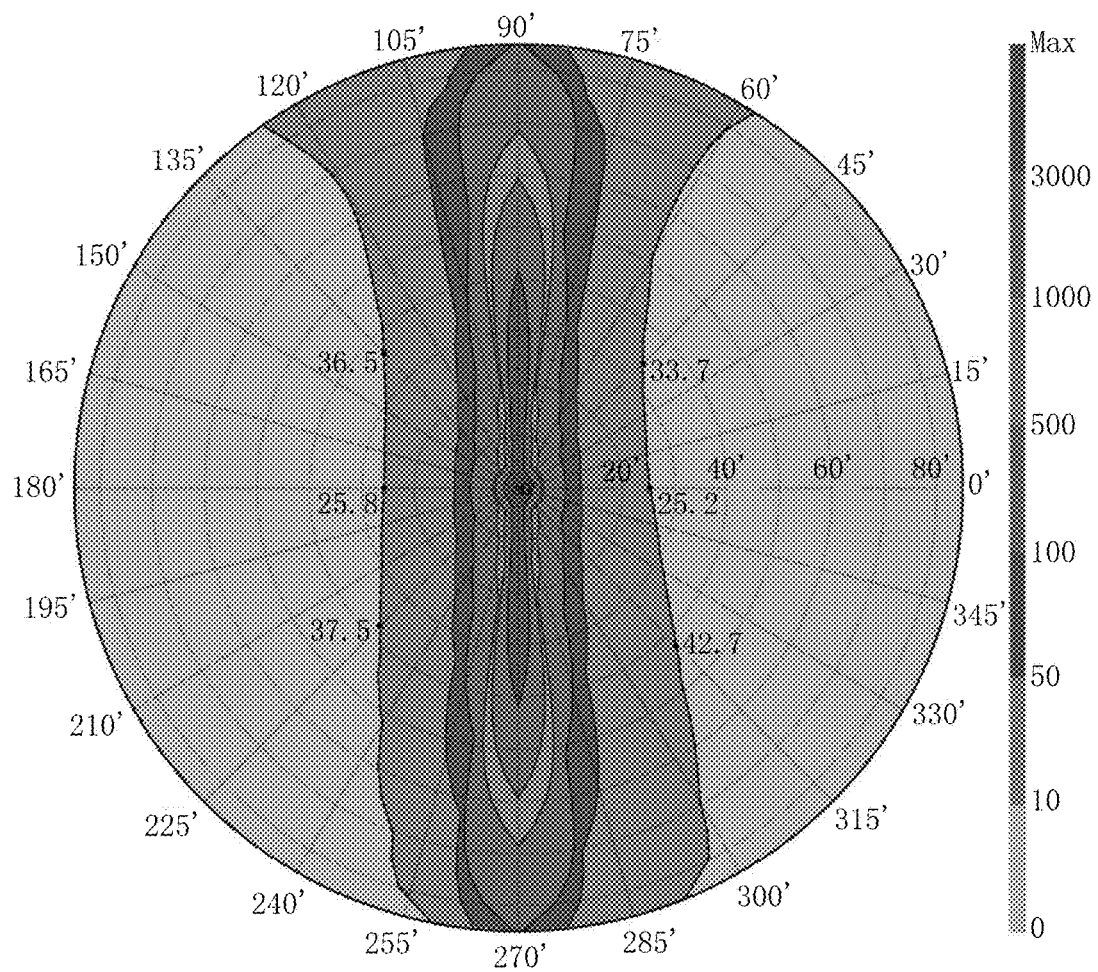
FIGS. 6a-6e show various viewing angle simulation results of the LCD of FIG. 1 when different bias voltages are applied to the first electrode.
Figure 6B:
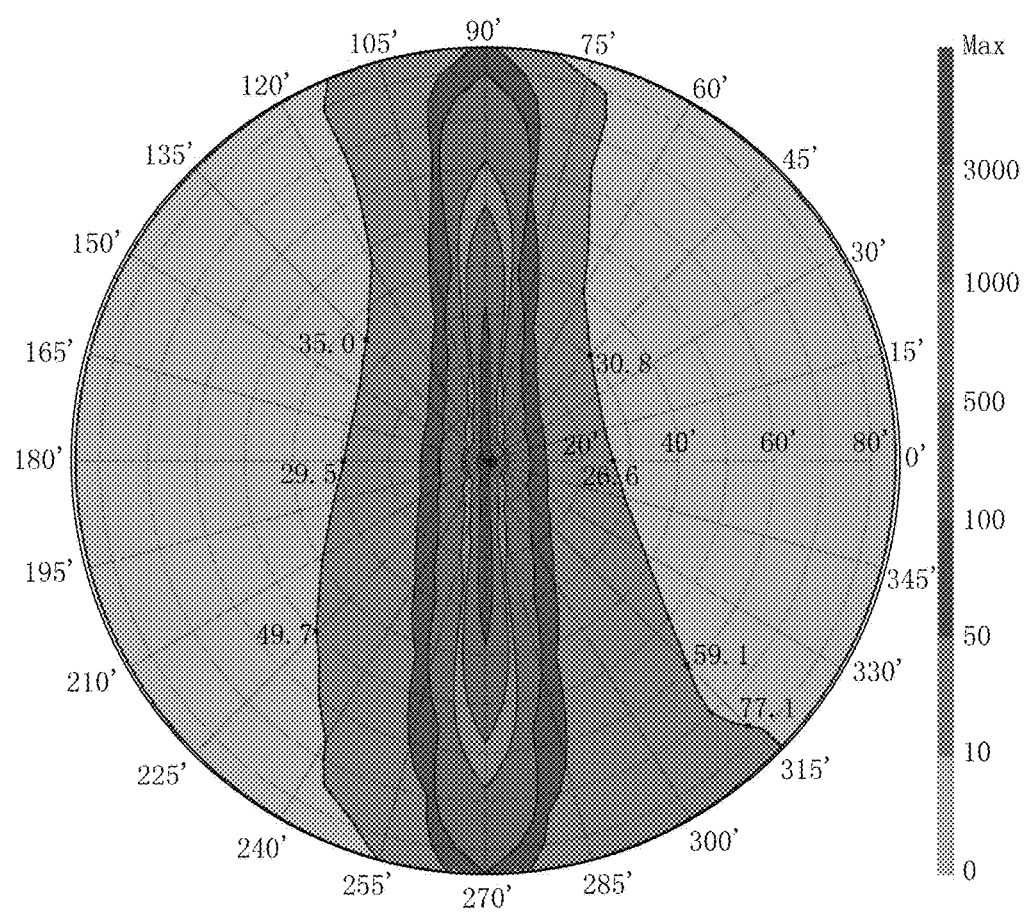
Figure 6C:
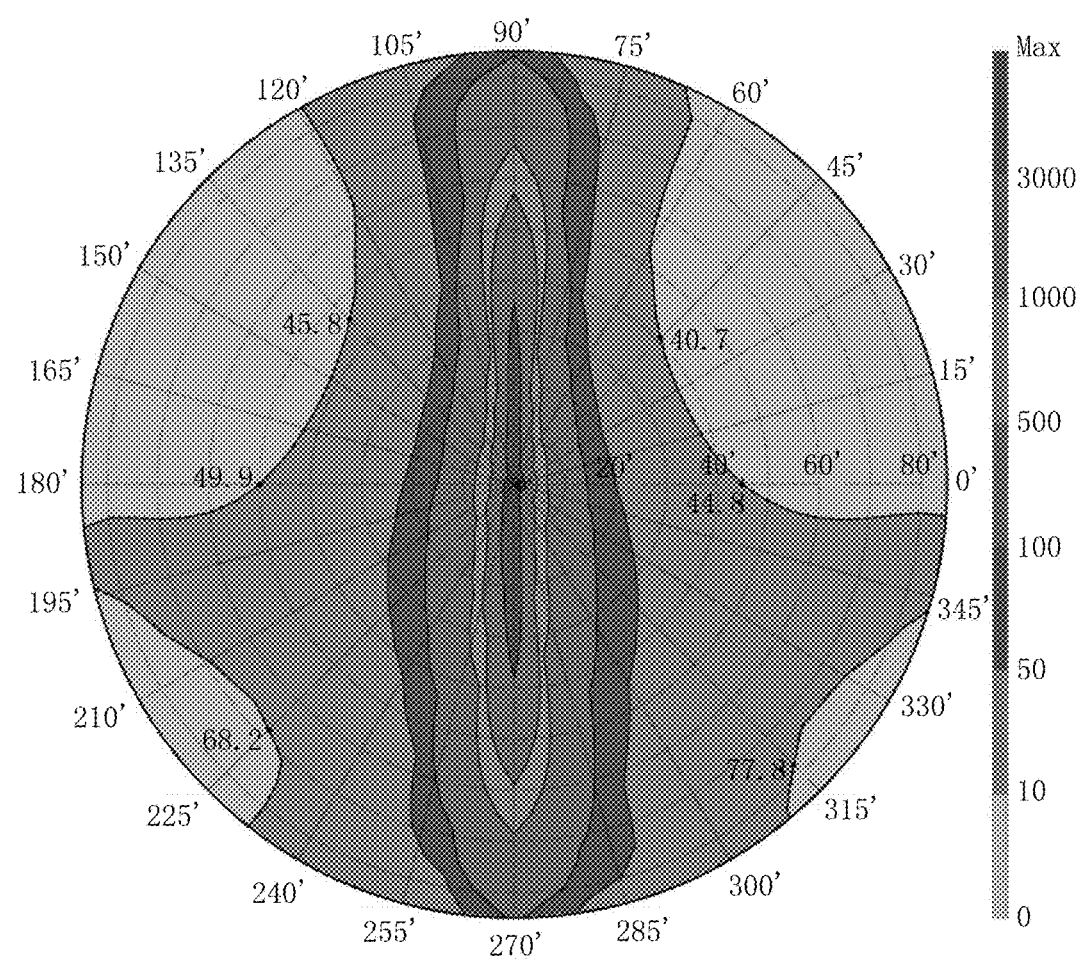
Figure 6D:
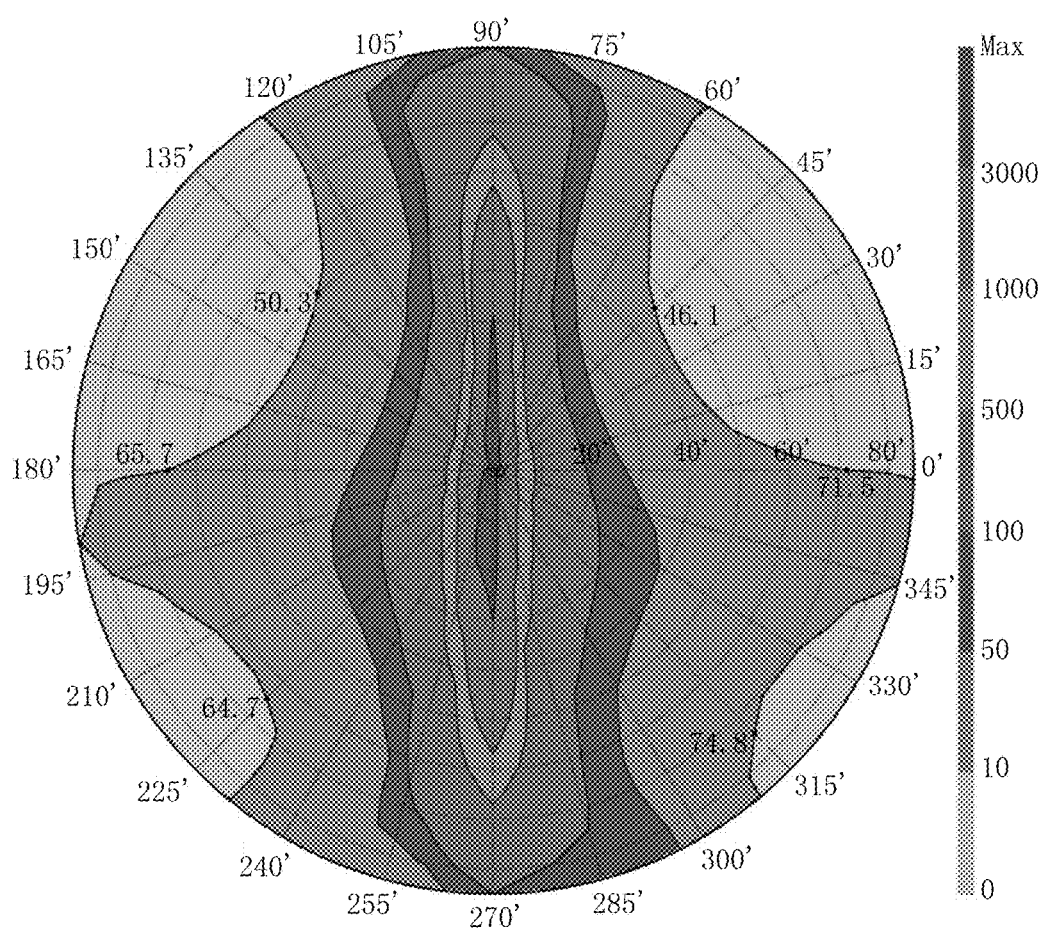
Figure 6E:
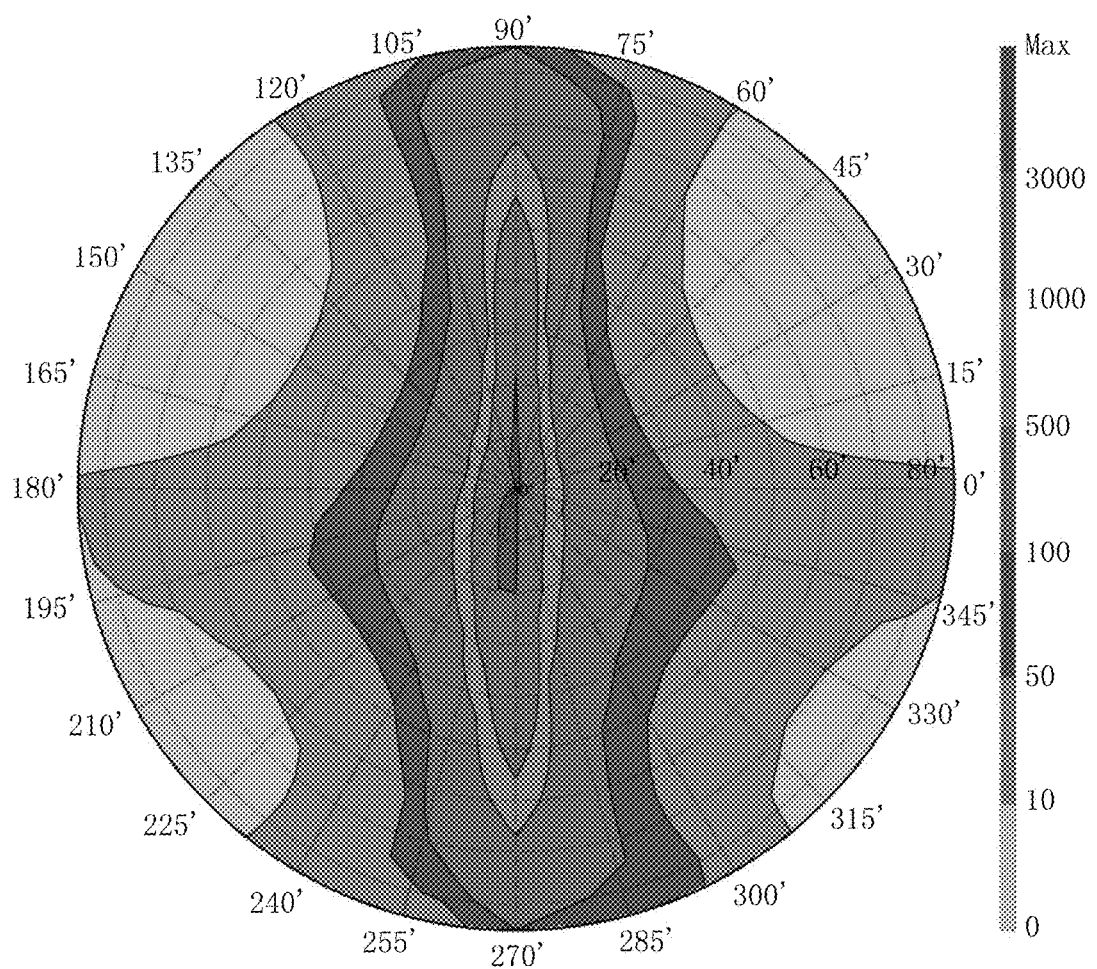

FIGS. 6a-6e show various viewing angle simulation results of the LCD 1 when different bias voltages are applied to the first electrode 104. In FIGS. 6a-6e, it is assumed that the initial first pretilt angle $\theta_1$ and the initial second pretilt angle $\theta_2$ have a magnitude of 40°. When the first electrode 104 is provided with different bias voltages, the effective viewing angles of the LCD 1 as viewed from the horizontal direction are different. For example, when no bias voltage is applied to the first electrode 104, the LCD 1 has a center contrast of 6365.24 and has an effective viewing angle from about −26 degrees to about 25 degrees in the horizontal direction, as shown in FIG. 6a; when a bias voltage of 2V is applied to the first electrode 104, the LCD 1 has a center contrast of 6351.24 and has an effective viewing angle from about −26 degrees to about 25 degrees in the horizontal direction, as shown in FIG. 6b; when a bias voltage of 4V is applied to the first electrode 104, the LCD 1 has a center contrast of 4490.25 and has an effective viewing angle from about −30 degrees to about 27 degrees in the horizontal direction, as shown in FIG. 6c; when a bias voltage of 6V is applied to the first electrode 104, the LCD 1 has a center contrast of 3777 and has an effective viewing angle from about −66 degrees to about 71.5 degrees in the horizontal direction, as shown in FIG. 6d; and when a bias voltage of 8V is applied to the first electrode 104, the LCD 1 has a center contrast of 3239.01 and has an effective viewing angle from about −85 degrees to about 85 degrees in the horizontal direction, as shown in FIG. 6e.

Therefore, from FIGS. 6a to 6e, it can be seen that, when the bias voltage applied to the first electrode 104 increases, the LCD 1 can switch from a narrow viewing angle to a wide viewing angle. In addition, when no bias voltage is applied to the first electrode 104, the light leakage phenomenon will become more serious, and a narrow viewing angle in the range from about −26 degrees to about 25 degrees can be effectively achieved in the horizontal direction. When the first electrode 104 is applied with a bias voltage of 6V, the LCD 1 will have an effective viewing angle of about −66 degrees to about 71.5 degrees in the horizontal direction. When the first electrode 104 is applied with a bias voltage of 8V, the LCD 1 will have an effective viewing angle of about −85 degrees to about 85 degrees in the horizontal direction. However, the center contrast of the LCD 1 has little change when the bias voltage changes from 6V to 8V. Therefore, when the first electrode 104 is applied with a relatively large bias voltage (e.g., 6V~8V), the LCD 1 can achieve a wide viewing angle and has a display effect comparable with conventional FFS type LCDs. Thus, when the LCD is displayed with a wide viewing angle, the bias voltage applied to the first electrode is preferable in the range of 6V to 8V.

Figure 7A:
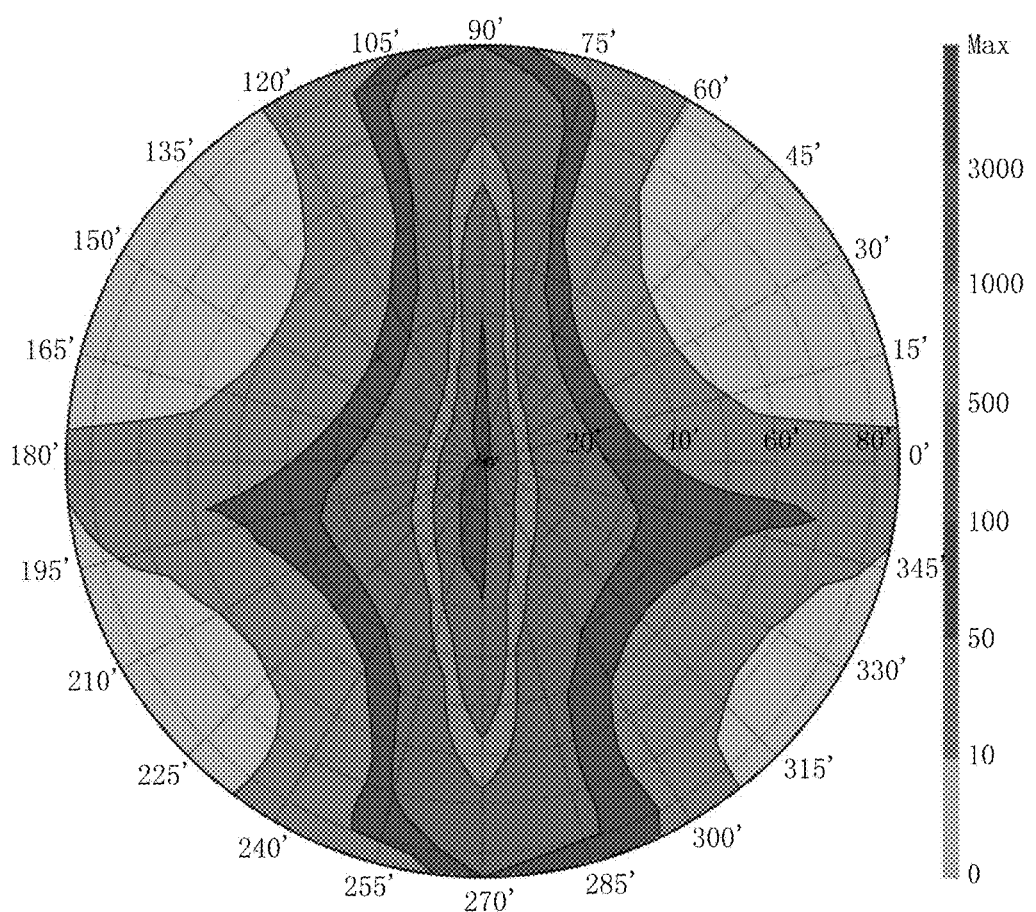
FIGS. 7a-7f show various viewing angle simulation results of the LCD of FIG. 1 when a bias voltage of 8V is applied to the first electrode.
Figure 7B:
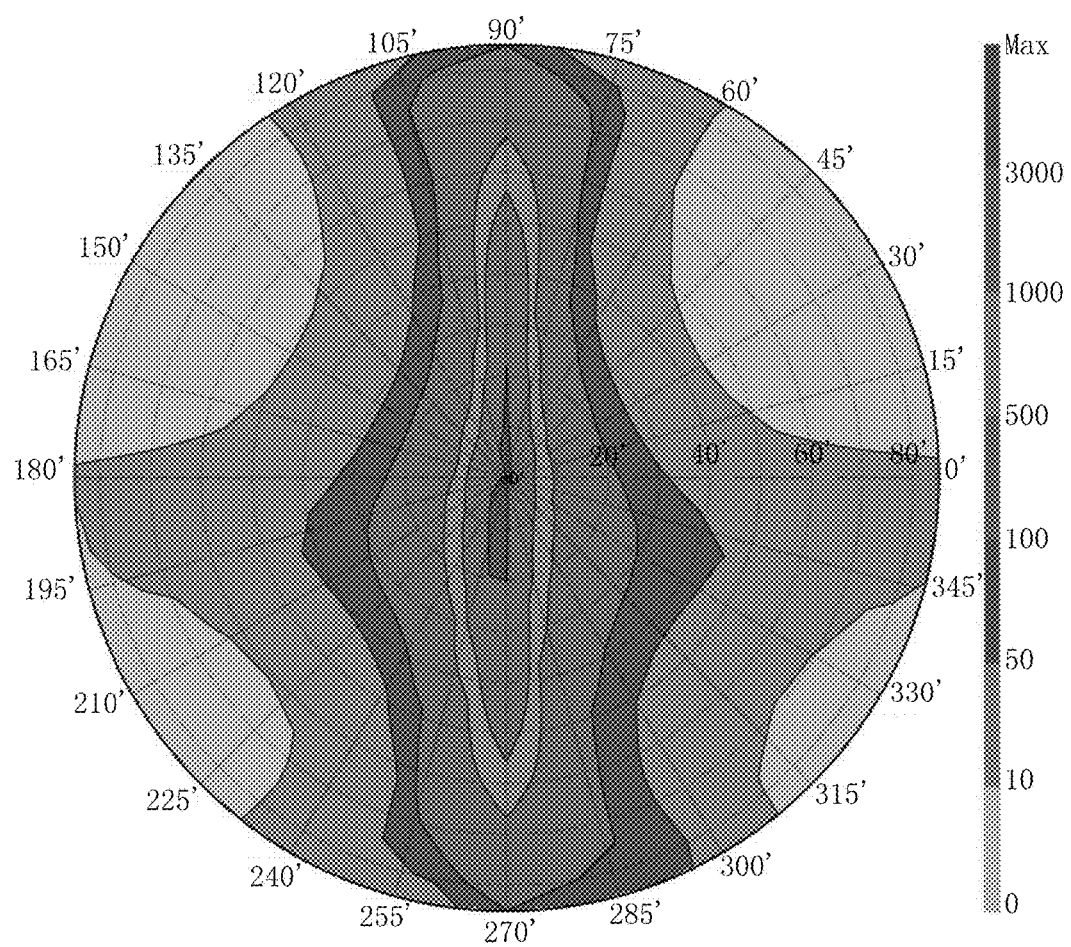
Figure 7C:
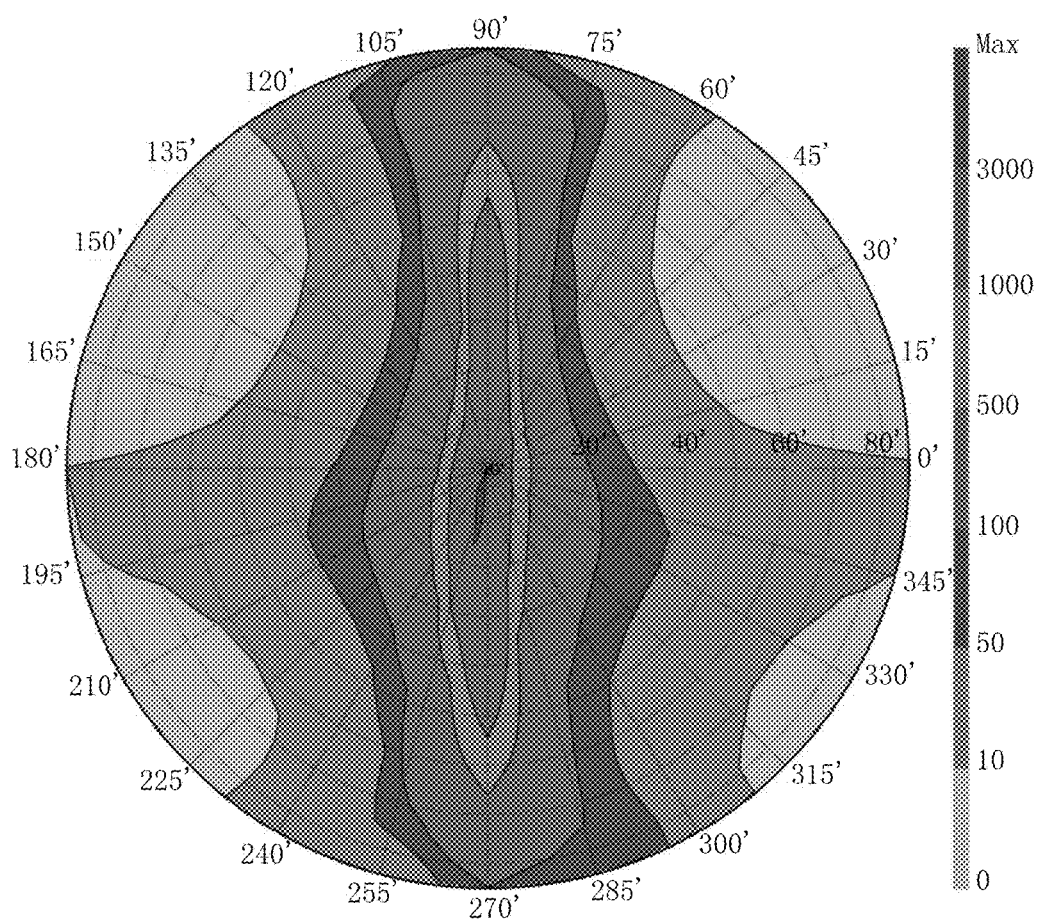
Figure 7D:
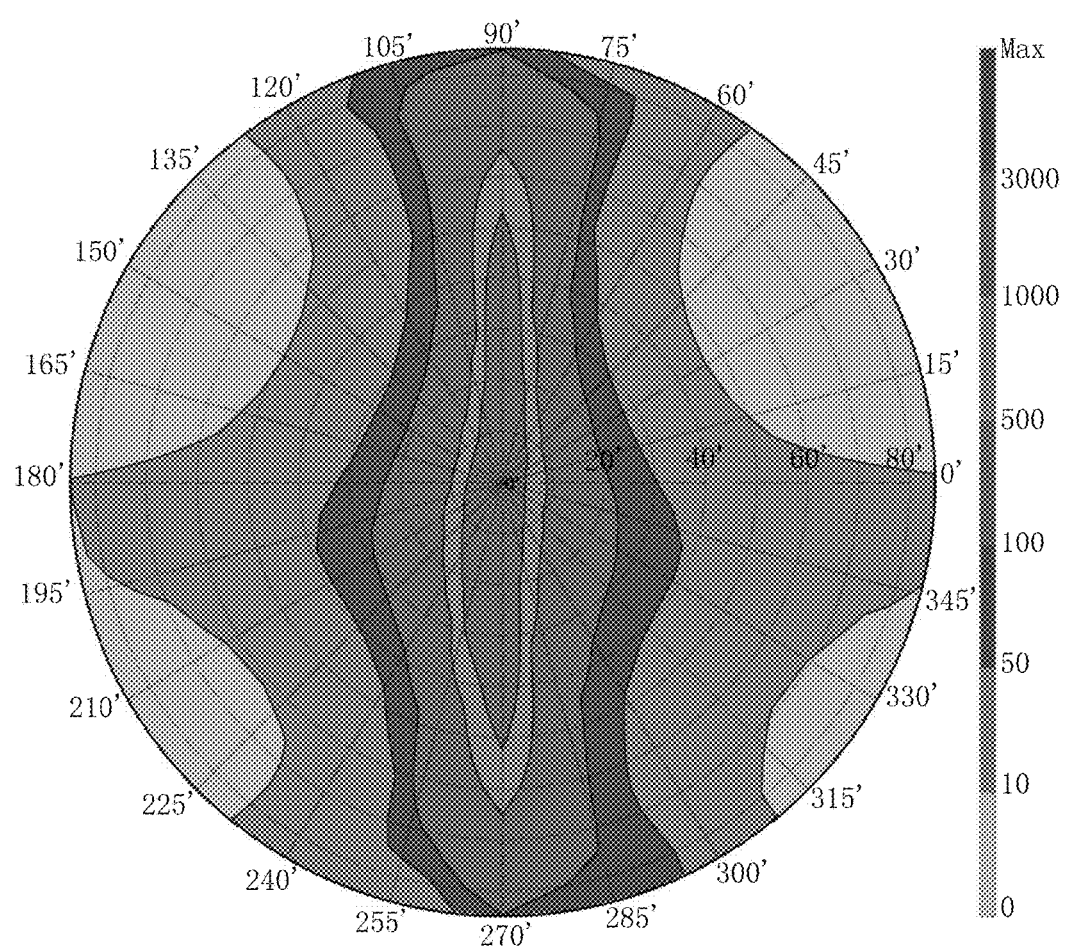
Figure 7E:
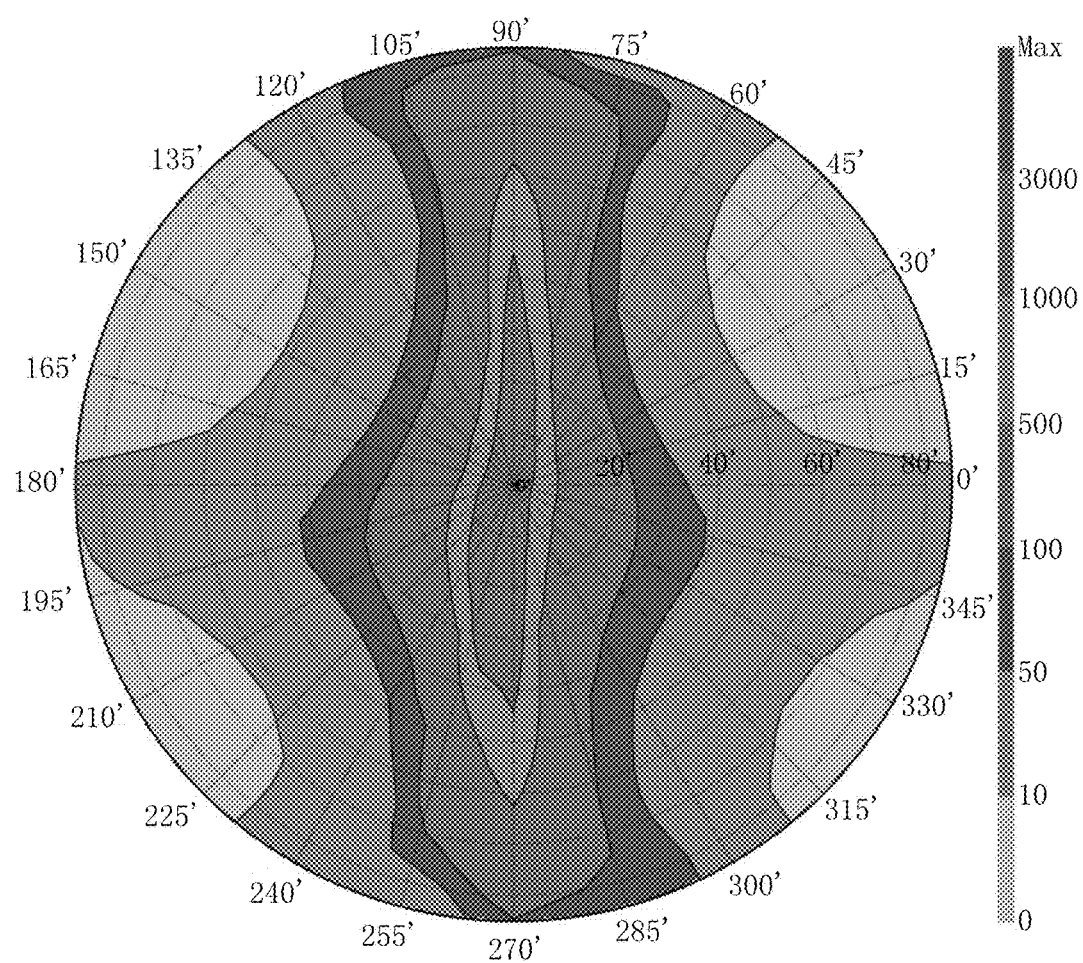
Figure 7F:
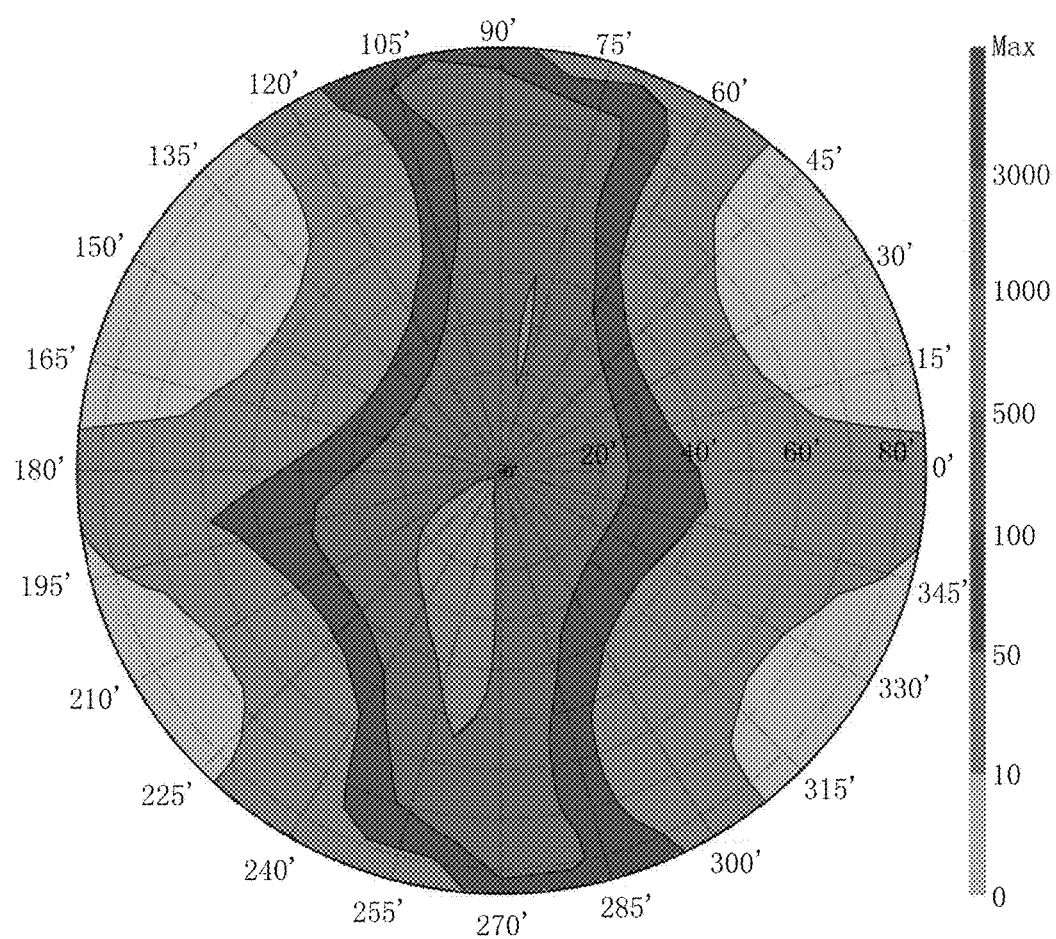

FIGS. 7a-7f show various viewing angle simulation results of the LCD 1 when a bias voltage of 8V is applied to the first electrode 104. Among them, FIG. 7a shows the viewing angle simulation result when the initial first pretilt angle $\theta_1$ and the initial second pretilt angle $\theta_2$ have a magnitude of 30°; FIG. 7b shows the viewing angle simulation result when the initial first pretilt angle $\theta_1$ and the initial second pretilt angle $\theta_2$ have a magnitude of 40°; FIG. 7c shows the viewing angle simulation result when the initial first pretilt angle $\theta_1$ and the initial second pretilt angle $\theta_2$ have a magnitude of 50°; FIG. 7d shows the viewing angle simulation result when the initial first pretilt angle $\theta_1$ and the initial second pretilt angle $\theta_2$ have a magnitude of 60°; FIG. 7e shows the viewing angle simulation result when the initial first pretilt angle $\theta_1$ and the initial second pretilt angle $\theta_2$ have a magnitude of 70°; and FIG. 7f shows the viewing angle simulation result when the initial first pretilt angle $\theta_1$ and the initial second pretilt angle $\theta_2$ have a magnitude of 80°. As can be seen from FIGS. 7a to 7f, with the increase of the initial first pretilt angle $\theta_1$ and the initial second pretilt angle $\theta_2$, the center contrast of the LCD 1 decreases, and the LCD 1 has a viewing angle of about 85 degrees in the vertical direction and the horizontal direction. For example, when the initial first pretilt angle $\theta_1$ and the initial second pretilt angle $\theta_2$ have a magnitude of 30°, the LCD 1 has a center contrast of 3516.5 and has an effective viewing angle of about 85 degrees in the vertical direction and the horizontal direction, as shown in FIG. 7a; when the initial first pretilt angle $\theta_1$ and the initial second pretilt angle $\theta_2$ have a magnitude of 40°, the LCD 1 has a center contrast of 3239.01 and has an effective viewing angle of about 85 degrees in the vertical direction and the horizontal direction, as shown in FIG. 7b; when the initial first pretilt angle $\theta_1$ and the initial second pretilt angle $\theta_2$ have a magnitude of 50°, the LCD 1 has a center contrast of 2809.7 and has an effective viewing angle of about 85 degrees in the vertical direction and the horizontal direction, as shown in FIG. 7c; when the initial first pretilt angle $\theta_1$ and the initial second pretilt angle $\theta_2$ have a magnitude of 60°, the LCD 1 has a center contrast of 2277.62 and has an effective viewing angle of about 85 degrees in the vertical direction and the horizontal direction, as shown in FIG. 7d; when the initial first pretilt angle $\theta_1$ and the initial second pretilt angle $\theta_2$ have a magnitude of 70°, the LCD 1 has a center contrast of 1538.23 and has an effective viewing angle of about 85 degrees in the vertical direction and the horizontal direction, as shown in FIG. 7e; and when the initial first pretilt angle $\theta_1$ and the initial second pretilt angle $\theta_2$ have a magnitude of 80°, the LCD 1 has a center contrast of 460.623 and has an effective viewing angle of about 85 degrees in the vertical direction and the horizontal direction, as shown in FIG. 7f. From FIGS. 7a to 7f, it can be seen that the LCD 1 can achieve a wide viewing angle and meets the display requirement when a relatively large bias voltage (e.g., 8V) is applied to the first electrode 104.

Figure 8A:
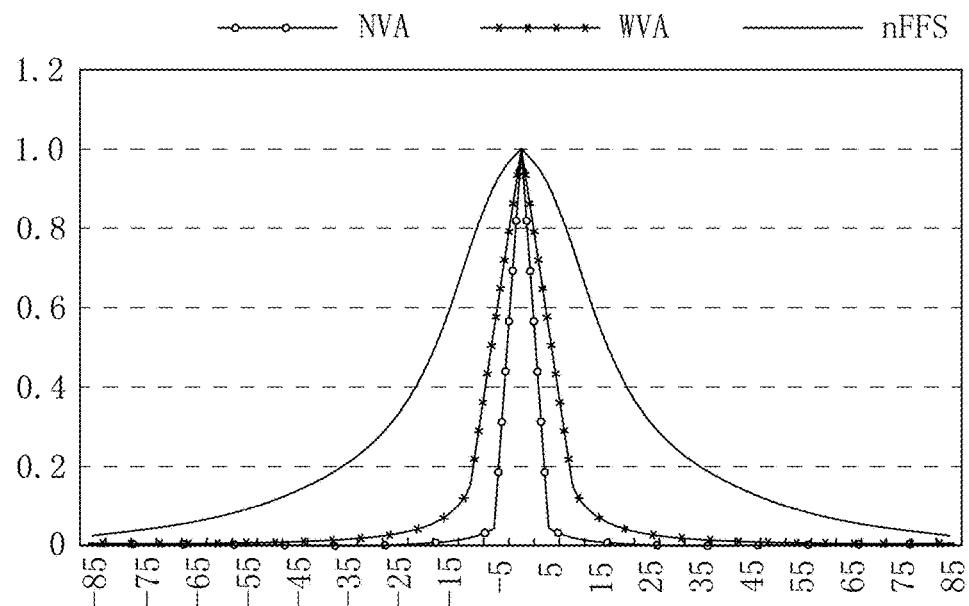
FIG. 8a is a graph showing the center contrast of the LCD of FIG. 1 and a conventional FFS type LCD in a horizontal direction.

FIG. 8a is a graph showing the contrast of the present LCD 1 and a conventional FFS type LCD in the horizontal direction. In FIG. 8a, it is assumed that each of the initial first pretilt angle $\theta_1$ and the initial second pretilt angle $\theta_2$ has a magnitude of 40°. The curve NVA denotes the contrast of the present LCD 1 with a narrow viewing angle, the curve WVA denotes the contrast of the present LCD 1 with a wide viewing angle, and the curve nFFS denotes the contrast of a conventional FFS type LCD with negative liquid crystal molecules. As shown in FIG. 8a, in the left side of the horizontal direction, the contrast of the present LCD 1 and the contrast of the conventional FFS type LCD are both decreased as the viewing angle increases, and the contrast of the present LCD 1 drops more rapidly as compared with the contrast of the conventional FFS type LCD. In the right side of the horizontal direction, the contrast of the present LCD 1 and the contrast of the conventional FFS type LCD are also both decreased as the viewing angle increases, and the contrast of the present LCD 1 drops more rapidly as compared with the contrast of the conventional FFS type LCD. In addition, it can be seen from FIG. 8a that the contrast of the present LCD 1 and the contrast of the conventional FFS type LCD are in a comparable level.

Figure 8B:
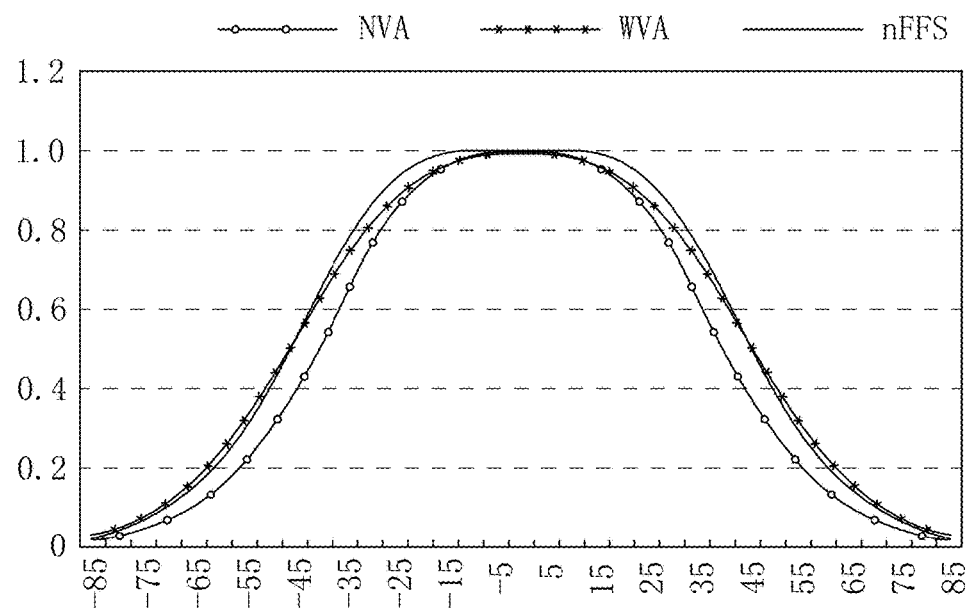
FIG. 8b is a graph showing the center contrast of the LCD of FIG. 1 and a conventional FFS type LCD in a vertical direction.

FIG. 8b is a graph showing the contrast of the present LCD 1 and a conventional FFS type LCD in the vertical direction. In FIG. 8b, it is assumed that each of the initial first pretilt angle $\theta_1$ and the initial second pretilt angle $\theta_2$ has a magnitude of 40°. The curve NVA denotes the contrast of the present LCD 1 with a narrow viewing angle, the curve WVA denotes the contrast of the present LCD 1 with a wide viewing angle, and the curve nFFS denotes the contrast of a conventional FFS type LCD with negative liquid crystal molecules. As shown in FIG. 8b, in the lower side of the vertical direction, the contrast of the present LCD 1 and the contrast of the conventional FFS type LCD are both decreased as the viewing angle increases, and the contrast of the present LCD 1 drops at almost the same speed when compared with the contrast of the conventional FFS type LCD. In the upper side of the vertical direction, the contrast of the present LCD 1 and the contrast of the conventional FFS type LCD are also both decreased as the viewing angle increases, and the contrast of the present LCD 1 drops at almost the same speed when compared with the contrast of the conventional FFS type LCD. In addition, it can be seen from FIG. 8b that the contrast of the present LCD 1 and the contrast of the conventional FFS type LCD are in a comparable level.

In the following table, it is assumed that the initial first pretilt angle $\theta_1$ and the initial second pretilt angle $\theta_2$ of the present LCD 1 have a magnitude of 40°, NVA denotes the present LCD 1 with the narrow viewing angle display mode, WVA denotes the present LCD 1 with the wide viewing angle display mode (a bias voltage of 6V or 8V is applied to the first electrode 104), and nFFS denotes a conventional FFS type LCD with negative liquid crystal molecules. As can be seen from the table, the transmittance (TR) and the response time (RT) of the present LCD 1 in a narrow viewing angle or in a wide viewing angle are comparable with the transmittance (TR) and the response time (RT) of the conventional FFS type LCD.

| | category | | | |
|---|---|---|---|---|
| | nFFS | NVA | WVA (bias voltage of 6 V) | WVA (bias voltage of 8 V) |
| voltage | 4.2 | 5 | 6 | 7.6 |
| transmittance | 3.48% | 3.32% | 3.18% | 3.16% |
| response time | 31.4 | 20.52 | 32.48 | 40.12 |
| | 16.58 | 24.78 | 27.60 | 27.35 |

Figure 9:
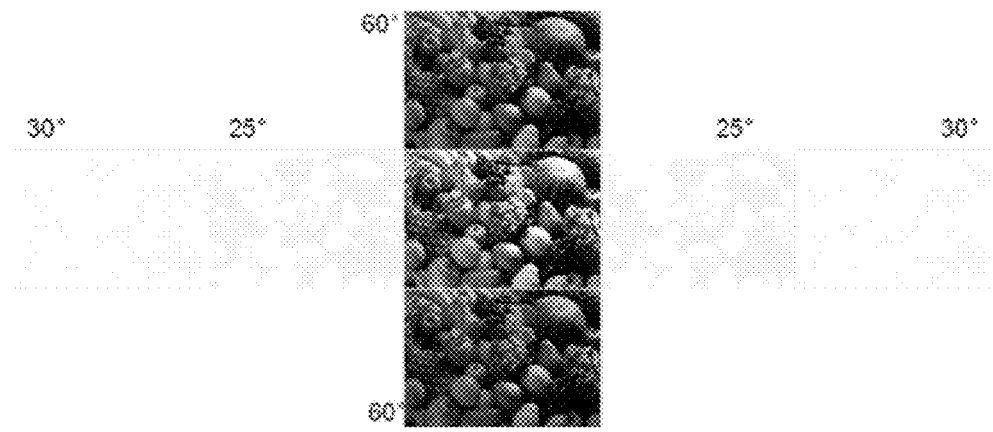
FIG. 9 shows the display effect of the LCD of FIG. 1 in a narrow viewing angle display mode.

FIG. 9 shows the display effect of the present LCD 1 in a narrow viewing angle display mode. In FIG. 9, each of the initial first pretilt angle $\theta_1$ and the initial second pretilt angle $\theta_2$ has a magnitude of 40°, and no bias voltage is applied to the first electrode 104. It can be seen from FIG. 9, at least in the horizontal direction, the display effect when viewed from a viewing angle of greater than 25 degrees is poor compared with the display effect when viewed from the front of the screen. Thus, the present LCD 1 can satisfy the demand for protecting privacy in public places when the present LCD 1 is displayed in a narrow viewing angle display mode.

Figure 10:
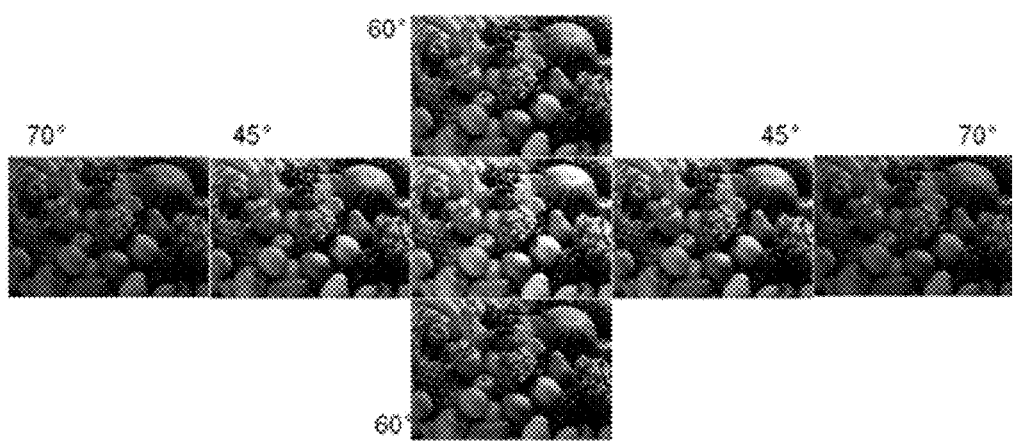
FIG. 10 shows the display effect of the LCD of FIG. 1 in a wide viewing angle display mode.

FIG. 10 shows the display effect of the present LCD 1 in a wide viewing angle display mode. In FIG. 10, each of the initial first pretilt angle $\theta_1$ and the initial second pretilt angle $\theta_2$ has a magnitude of 40°, and a bias voltage of 6V is applied to the first electrode 104. It can be seen from FIG. 10, in the vertical direction, the display effect when viewed from a viewing angle of 60 degrees is comparable with the display effect when viewed from the front of the screen; in the horizontal direction, the display effect when viewed from a viewing angle of 70 degrees is comparable with the display effect when viewed from the front of the screen. Thus, the present LCD 1 can achieve a relatively large viewing angle when the present LCD 1 is displayed in a wide viewing angle display mode. The present LCD 1 can switch from the narrow viewing angle display mode to the wide viewing angle display mode by applying a bias voltage to the first electrode 104 of the first substrate 10.

From the above, in the present LCD 1, the liquid crystal molecules 301 adjacent to the first alignment film 106 are tilted at a first pretilt angle $\theta_1$ relative to the first alignment film 106, and the liquid crystal molecules 301 adjacent to the second alignment film 210 are tilted at a second pretilt angle $\theta_2$ relative to the second alignment film 210, wherein the first pretilt angle $\theta_1$ and the second pretilt angle $\theta_2$ have the same magnitude but are contrary in direction. By applying a bias voltage to the first electrode 104 or not, the rotation of the liquid crystal molecules 301 of the liquid crystal layer 30 can be controlled, and accordingly the present LCD 1 can switch between a narrow viewing angle and a wide viewing angle.

When no bias voltage is applied to the first electrode 104, the first pretilt angle $\theta_1$ and the second pretilt angle $\theta_2$ are not matched with the light transmission axis X1, X2 of the first polarizer 102 and the second polarizer 202, a light leakage phenomenon in dark state is resulted and the contrast of images of the present LCD 1 is decreased, to thereby achieve a narrow viewing angle display mode.

When a bias voltage is applied to the first electrode 104, a vertical electric field is generated between the first substrate 10 and the second substrate 20 to cause the liquid crystal molecules 301 of the liquid crystal layer 30 to rotate. As the liquid crystal molecules 301 rotate, the tilt angle of the liquid crystal molecules 301 adjacent to the first alignment film 106 is gradually reduced from the initial first pretilt angle $\theta_1$, and the tilt angle of the liquid crystal molecules 301 adjacent to the second alignment film 210 is gradually reduced from the initial second pretilt angle $\theta_2$. Particularly, when a relatively large bias voltage is applied to the first electrode 104, the tilt angle of the liquid crystal molecules 301 adjacent to the first alignment film 106 may reduce from the initial first pretilt angle $\theta_1$ to nearly zero degree in which the liquid crystal molecules 301 adjacent to the first alignment film 106 are substantially parallel to the first substrate 10, and the tilt angle of the liquid crystal molecules 301 adjacent to the second alignment film 210 may reduce from the initial second pretilt angle $\theta_2$ to nearly zero degree in which the liquid crystal molecules 301 adjacent to the second alignment film 210 are substantially parallel to the second substrate 20, the light leakage phenomenon in dark state is relieved, the contrast of images of the present LCD 1 is increased, to thereby achieve a wide viewing angle display mode.

Accordingly, in another aspect, a method of controlling a viewing angle of the LCD 1 is provided. The method includes the steps: when the LCD 1 is required to display with a narrow viewing angle, applying no bias voltage to the first electrode 104; and when the LCD 1 is required to display with a wide viewing angle, applying a bias voltage to the first electrode 104. Preferably, the first pretilt angle $\theta_1$ is in the range of 30° to 80°, the second pretilt angle $\theta_2$ has same magnitude as the first pretilt angle $\theta_1$, and the bias voltage applied to the first electrode 104 is in the range of 6V to 8V.

Therefore, the present LCD 1 can easily achieve a narrow viewing angle and a wide viewing angle by controlling the bias voltage applied to the first electrode 104 of the first substrate 10. It is not required to use a louver shielding film or to provide a dual light source backlight system in the present LCD 1, the present LCD 1 can be switched between a narrow viewing angle and a wide viewing angle according to requirements, without increasing the thickness and the cost of the LCD and having the advantages of easy operation and good flexibility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LCD (liquid crystal display) with switchable viewing angle, comprising:
   a first substrate being provided with a first electrode and a first alignment film thereon;
   a second substrate being provided with a second electrode, a third electrode and a second alignment film thereon, wherein one of the second electrode and the third electrode is a common electrode, and the other one of the second electrode and the third electrode is a pixel electrode;
   a liquid crystal layer being disposed between the first alignment film and the second alignment film, the liquid crystal layer comprising a plurality of liquid crystal molecules, wherein the liquid crystal molecules are negative liquid crystal molecules, the liquid crystal molecules adjacent to the first alignment film are tilted at a first pretilt angle, the liquid crystal molecules adjacent to the second alignment film are tilted at a second pretilt angle, the first pretilt angle and the second pretilt angle have the same magnitude but are contrary in direction;
   wherein when no bias voltage is applied to the first electrode, the LCD is displayed with a narrow viewing angle; and when a bias voltage is applied to the first electrode to generate a vertical electric field between the first substrate and the second substrate, the LCD is displayed with a wide viewing angle.

2. The LCD according to claim 1, wherein the first pretilt angle is in the range of 30°~80°, and the second pretilt angle has the same magnitude as the first pretilt angle.

3. The LCD according to claim 2, wherein when the LCD is displayed with a wide viewing angle, the bias voltage applied to the first electrode is in the range of 6V to 8V.

4. The LCD according to claim 2, wherein the liquid crystal molecules adjacent to the first alignment film are tilted in a counter-clockwise direction to form the first pretilt angle, and the liquid crystal molecules adjacent to the second alignment film are tilted in a clockwise direction to form the second pretilt angle.

5. The LCD according to claim 1, wherein the first alignment film has a first rubbing direction, the second alignment film has a second rubbing direction, the liquid crystal molecules adjacent to the first alignment film are arranged and oriented along the first rubbing direction of the first alignment film at a tilted state with the first pretilt angle, the liquid crystal molecules adjacent to the second alignment film are arranged and oriented along the second rubbing direction of the second alignment film at a tilted state with the second pretilt angle.

6. The LCD according to claim 1, wherein the polarity of the bias voltage applied to the first electrode is contrary to the polarity of the common voltage provided to the common electrode.

7. The LCD according to claim 1, wherein the second electrode is a pixel electrode, and the third electrode is a common electrode.

8. The LCD according to claim 1, wherein the third electrode is a pixel electrode, and the second electrode is a common electrode.

9. The LCD according to claim 1, wherein the first electrode is a surface electrode without being patterned.

10. The LCD according to claim 1, wherein at least one of the second electrode and the third electrode is patterned to form electrode stripes which are arranged in parallel to each other.

11. The LCD according to claim 1, wherein the first substrate further comprises a first transparent base, the first electrode is arranged on a surface of the first transparent base facing the liquid crystal layer, the first alignment film is arranged on a surface of the first electrode facing the liquid crystal layer.

12. The LCD according to claim 1, wherein the second substrate further comprises a second transparent base and an insulating layer, the second electrode is arranged on a surface of the second transparent base facing the liquid crystal layer, the insulating layer is arranged on a surface of the second electrode facing the liquid crystal layer, the third electrode is arranged on a surface of the insulating layer facing the liquid crystal layer, the second alignment film is arranged on a surface of the third electrode facing the liquid crystal layer.

13. A method of controlling the viewing angle of the LCD of claim 1, comprising the steps:
  when the LCD is required to display with a narrow viewing angle, applying no bias voltage to the first electrode;
  when the LCD is required to display with a wide viewing angle, applying a bias voltage to the first electrode.

14. The method according to claim 13, wherein the first pretilt angle is in the range of 30° to 80°, the second pretilt angle has the same magnitude as the first pretilt angle, and the bias voltage applied to the first electrode is in the range of 6V to 8V.

* * * * *